United States Patent
Shin et al.

(10) Patent No.: US 11,415,831 B2
(45) Date of Patent: Aug. 16, 2022

(54) DISPLAY DEVICE

(71) Applicant: Samsung Display Co., Ltd., Yongin-Si (KR)

(72) Inventors: Seung-Woon Shin, Asan-si (KR); Jongwoon Kim, Cheonan-si (KR); Kyu-Jin Park, Cheonan-si (KR); Woon-Rok Jang, Cheonan-si (KR); Tae-Seok Ha, Hwaseong-si (KR)

(73) Assignee: Samsung Display Co., Ltd.

( * ) Notice: Subject to any disclaimer, the term of this patent is extended or adjusted under 35 U.S.C. 154(b) by 140 days.

(21) Appl. No.: 16/896,148

(22) Filed: Jun. 8, 2020

(65) Prior Publication Data

US 2021/0096423 A1 Apr. 1, 2021

(30) Foreign Application Priority Data

Sep. 30, 2019 (KR) .......................... 10-2019-0121066

(51) Int. Cl.
*G02F 1/13357* (2006.01)
*G09G 3/34* (2006.01)
*G09G 3/36* (2006.01)
*G02F 1/1362* (2006.01)
*G02F 1/1335* (2006.01)

(52) U.S. Cl.
CPC ..... *G02F 1/133602* (2013.01); *G09G 3/3406* (2013.01); *G02F 1/133612* (2021.01); *G02F 1/136286* (2013.01); *G09G 3/3426* (2013.01); *G09G 3/3677* (2013.01); *G09G 2320/0626* (2013.01)

(58) Field of Classification Search
CPC .......................... G02F 1/133602; G09G 3/3406
See application file for complete search history.

(56) References Cited

U.S. PATENT DOCUMENTS

2017/0116928 A1* 4/2017 Kim .................. G02F 1/136286
2019/0096331 A1* 3/2019 Kwon .................. G09G 3/3275

FOREIGN PATENT DOCUMENTS

| KR | 10-0153053 B1 | 12/1998 |
| KR | 10-2011-0066513 A | 6/2011 |
| KR | 10-1577825 B1 | 12/2015 |
| KR | 10-1683672 B1 | 12/2016 |

* cited by examiner

*Primary Examiner* — Dung T Nguyen
(74) *Attorney, Agent, or Firm* — Innovation Counsel LLP

(57) ABSTRACT

A display device may include a backlight unit, a display panel, and a backlight driver, and a panel driver. The backlight unit may include light source blocks including a first light source block. The display panel may include dimming regions including a first dimming region and respectively overlapping the light source blocks. The first dimming region may overlap the first light source block. The backlight driver may control a turn-on period and a turn-off period of each of the light source blocks. The panel driver may sequentially provide scan signals to the dimming regions for controlling light transmission of the dimming regions. A turn-off period of the first light source block may start before a scan period of the first dimming region and may end after the scan period of the first dimming region. The first dimming region may receive corresponding scan signals in the scan period.

11 Claims, 15 Drawing Sheets

DISPLAY DEVICE

CROSS-REFERENCE TO RELATED APPLICATION(S)

This U.S. non-provisional patent application claims priority under 35 U.S.C. § 119 to Korean Patent Application No. 10-2019-0121066, filed on Sep. 30, 2019, in the Korean Intellectual Property Office; the Korean Patent Application is incorporated by reference.

BACKGROUND

The technical field relates to a display device.

Display devices are used to display images and/or videos. Modern display devices include liquid crystal display devices.

A liquid crystal display device generates an image using light provided from a backlight unit. The backlight unit may include a plurality of light-emitting diodes.

SUMMARY

An embodiment may be related a display device that includes a backlight unit. The backlight unit may operate according to a dimming operation method. The display device may have satisfactory display quality.

An embodiment may be related to a display device. The display device may include a backlight unit, a display panel, and a backlight driver, and a panel driver. The backlight unit may include light source blocks including a first light source block. The display panel may include dimming regions including a first dimming region and respectively overlapping the light source blocks. The first dimming region may overlap the first light source block. The backlight driver may be electrically connected to the backlight unit and may control a turn-on period and a turn-off period of each of the light source blocks. The panel driver may be electrically connected to the display panel and may sequentially provide scan signals to the dimming regions for controlling light transmission of the dimming regions. A turn-off period of the first light source block may start before a scan period of the first dimming region and may end after the scan period of the first dimming region. The first dimming region may receive corresponding scan signals in the scan period.

The light source blocks may be arranged in a first direction. The backlight driver may sequentially provide the scan signals to the light source blocks according to the first direction.

The scan period of the first dimming region may start after a preceding turn-on period of the first light source block and may end before a subsequent turn-on period of the first light source block.

The scan period of the first dimming region may start after a preceding turn-on period of an n-th light source block and may end before a subsequent turn-on period of the n-th light source block. The n-th light source block may be different from the first light source block.

The panel driver may set a scan start time of the scan period of the first dimming region based on a duty ratio. The duty ratio may be a ratio of a length of a turn-on period of the first light source block to a length of a driving period of the first light source block.

The duty ratio may be less than 50%. The light source blocks may include a second light source block. The dimming regions may include a second dimming region that overlaps the second light source block. The turn-off period of the first light source block may overlap a scan period of the second dimming region.

The display device may include a lookup table that stores scan start times suitable for various duty ratios. The panel driver may sequentially provide the scan signals to the dimming regions at optimized scan start times determined based on the lookup table.

The backlight driver may sequentially output light source driving signals to sequentially control the light source blocks.

The light source driving signals include a first light source driving signal for controlling the first light source block. A value of the first light source driving signal may be higher in a high period than in a low period. The low period may overlap the scan period of the first dimming region.

The panel driver may include a gate driver for sequentially providing the scan signals to the dimming regions in response to a scan start signal. A frequency of the scan start signal may be equal to a frequency of one of the light source driving signals.

The first light source block may include light-emitting diodes electrically connected in series.

An embodiment may be related to a display device. The display device may include a backlight unit, a display panel, and a backlight driver, and a panel driver. The backlight unit may include light source blocks including a first light source block. The display panel may include dimming regions including a first dimming region and respectively overlapping the light source blocks. The first dimming region may overlap the first light source block. The backlight driver may be electrically connected to the backlight unit and may control a turn-on period and a turn-off period of each of the light source blocks. The panel driver may be electrically connected to the display panel and may sequentially provide scan signals to the dimming regions for controlling light transmission of the dimming regions. A turn-on period of the first light source block may start before a scan period of the first dimming region and may end after the scan period of the first dimming region. The first dimming region may receive corresponding scan signals in the scan period.

The light source blocks may be arranged in a first direction. The backlight driver may sequentially provide the scan signals to the light source blocks according to the first direction.

The scan period of the first dimming region may start after a preceding turn-off period of the first light source blocks and may end before a subsequent turn-off period of the first light source block.

The panel driver may set a scan start time of the scan period of the first dimming region based on a duty ratio. The duty ratio that may be a ratio of a length of the turn-on period of the first light source block to a length of a driving period of the first light source block.

The duty ratio may be greater than 50%. A turn-on period of each of the light source blocks may overlap a scan period of a corresponding one of the dimming regions.

The display device may include a look-up table that stores scan start times suitable for various duty ratios. The panel driver may sequentially provide the scan signals to the dimming regions at optimized scan start times determined based on the look-up table.

The backlight driver may sequentially output light source driving signals to sequentially control the light source blocks.

The panel driver may include a gate driver for sequentially providing the scan signals to the dimming regions in response to a scan start signal. A frequency of the scan start signal may be equal to a frequency of each of the light source driving signals.

The first light source block may include light-emitting diodes electrically connected in series.

DETAILED DESCRIPTION

Figure 1:
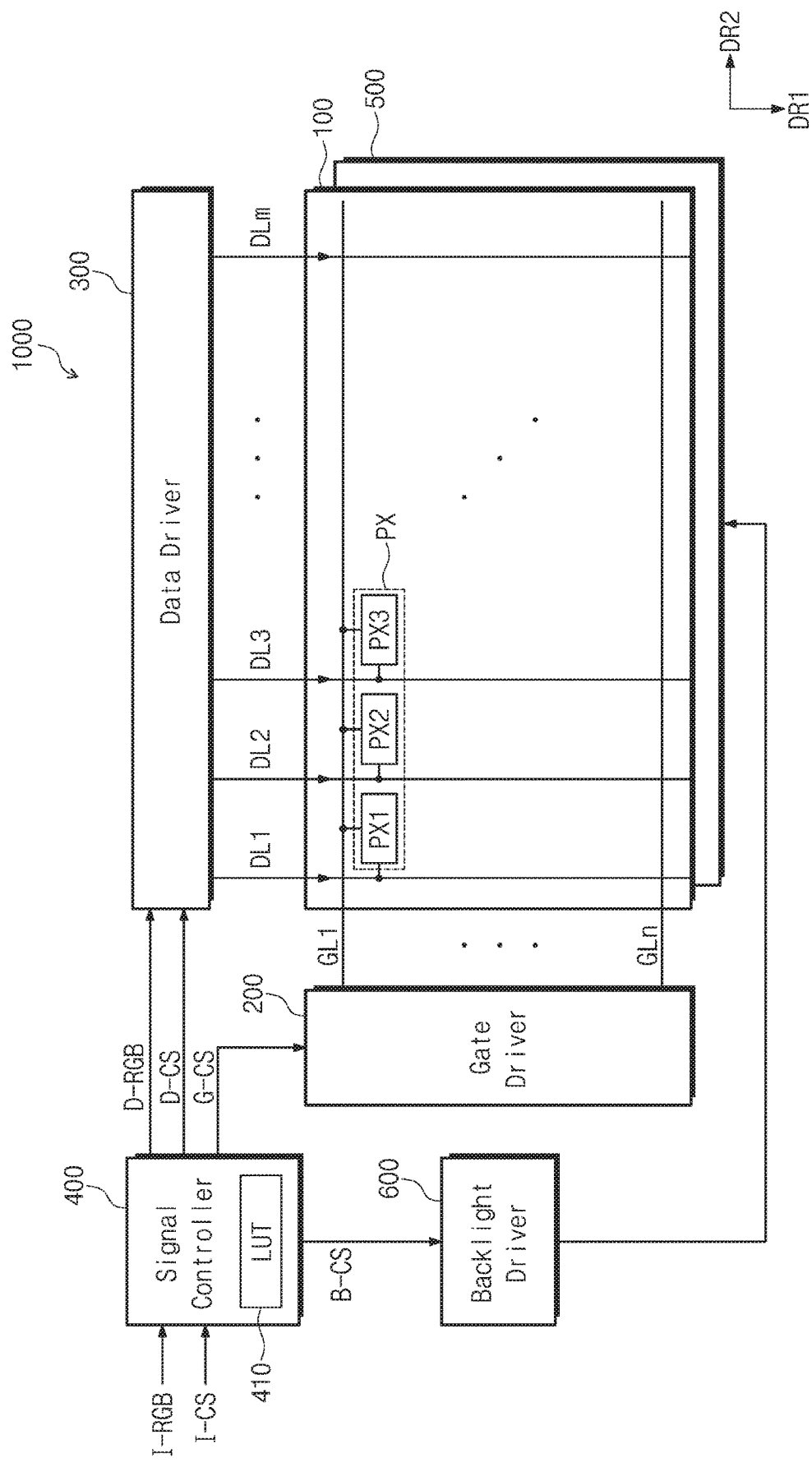
FIG. 1 is a block diagram illustrating a display device according to an embodiment.

Example embodiments are described with reference to the accompanying drawings. Practical embodiments may be embodied in many different forms and should not be construed as being limited to the example embodiments. In the drawings, dimensions may be exaggerated for clarity. Like reference numerals may denote like elements.

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-type (or first-set)," "second-type (or second-set)," etc., respectively.

When a first element is referred to as being "on," "connected," or "coupled" to a second element, the first element can be directly or indirectly on, connected, or coupled to the second element. When a first element is referred to as being "directly on," "directly connected," or "directly coupled" to a second element, there are no intended intervening elements (except environmental elements such as air) positioned or connected between the first element and the second element. Like numbers indicate like elements throughout.

Spatially relative terms, such as "beneath," "below," "lower," "above," and "upper" may encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors may be interpreted accordingly.

The terminology used herein is for the purpose of describing particular embodiments only and is not intended to be limiting of example embodiments. The singular forms "a," "an" and "the" may include the plural forms as well, unless the context clearly indicates otherwise. The terms "comprises", "comprising", "includes" and/or "including" may specify the presence of stated features, integers, steps, operations, elements, and/or components, but do not preclude the presence or addition of one or more other features, integers, steps, operations, elements, components, and/or groups.

Figures in the drawings may be schematic illustrations of idealized example embodiments. Variations from the shapes of the illustrations as a result, for example, of manufacturing techniques and/or tolerances, are to be expected. Thus, example embodiments should not be construed as limited to the particular shapes but may include deviations in shapes that result, for example, from manufacturing.

Unless otherwise defined, all terms (including technical and scientific terms) used herein have the same meaning as commonly understood by one of ordinary skill in the art. Terms should be interpreted as having meanings that are consistent with the context of the relevant art and should not be interpreted in an idealized or overly formal sense unless expressly defined.

The term "connect" may mean "electrically connect." The term "insulate" may mean "electrically insulate" or "electrically isolate." The term "drive" may mean "operate" or "control." The term "scan" may mean "provide with a scan/gate signal," "provide a scan/gate signal to," "provide with scan/gate signals," or "provide scan/gate signals to."

Figure 2:
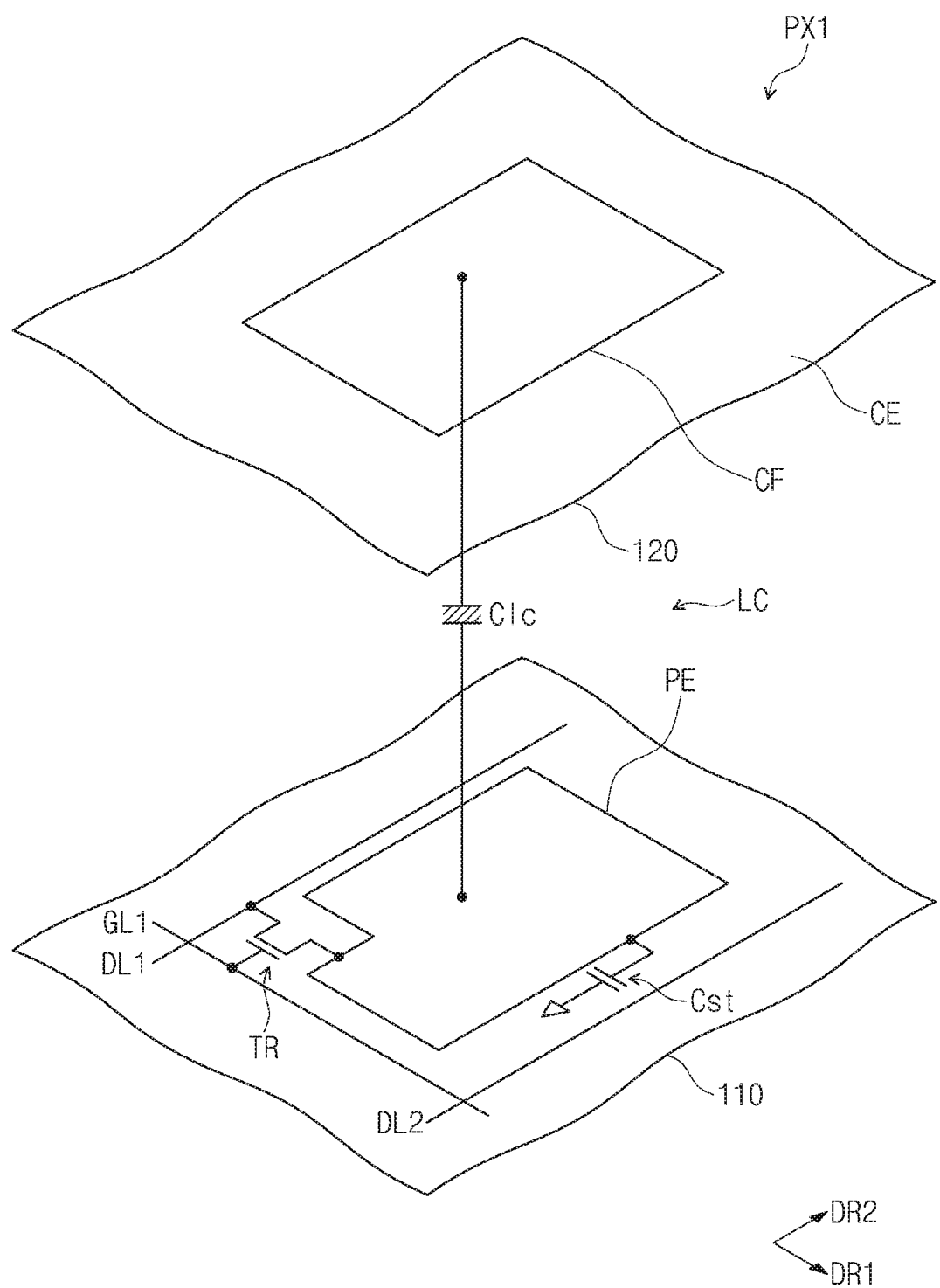
FIG. 2 is an equivalent circuit diagram of a first sub-pixel shown in FIG. 1 according to an embodiment.

FIG. 1 is a block diagram illustrating a display device according to an embodiment, and FIG. 2 is an equivalent circuit diagram of a first sub-pixel shown in FIG. 1 according to an embodiment.

Referring to FIG. 1, a display device 1000 may include a display panel 100 for displaying an image, panel drivers 200, 300, and 400 for driving the display panel 100, a backlight unit 500 for providing light to the display panel 100, and a backlight driver 600 driving the backlight unit 500. The panel drivers 200, 300, and 400 may include a gate driver 200, a data driver 300, and a signal controller 400.

The display panel 100 may include a plurality of gate lines GL1-GLn, a plurality of data lines DL1-DLm, and a plurality of pixels PX. The gate lines GL1-GLn may be arranged in a first direction DR1 and may be parallel to each other. The gate lines GL1-GLn may extend in a second direction DR2 different from the first direction DR1. The second direction DR2 may be substantially orthogonal to the first direction DR1. The data lines DL1-DLm may be arranged in the second direction DR2 and may extend in the first direction DR1.

Each of the pixels PX may include first to third sub-pixels PX1, PX2, and PX3. The first to third sub-pixels PX1, PX2, and PX3 may display images of different colors. The first sub-pixel PX1 may display a red color image, the second sub-pixel PX2 may display a green color image, and the third sub-pixel PX3 may display a blue color image. In embodiments, each of the pixels may include four sub-pixels. For example, each of the pixels may include first to fourth sub-pixels, and the first to fourth sub-pixels may display images of red, green, blue, and white colors or images of red, green, blue, and yellow colors.

The first to third sub-pixels PX1, PX2, and PX3 may be connected to different ones of the data lines DL1-DLm. For example, the first to third sub-pixels PX1, PX2, and PX3 may be connected to the first to third data lines DL1, DL2, and DL3, respectively.

Each of the first to third sub-pixels PX1, PX2, and PX3 may include a transistor TR and a liquid crystal capacitor Clc. The first to third sub-pixels PX1, PX2, and PX3 may have the same structure, and thus, in FIG. 2, the first sub-pixel PX1 will be described as an example of the sub-pixels.

Referring to FIG. 2, the display panel 100 may include a first substrate 110, a second substrate 120 facing the first substrate 110, and a liquid crystal layer LC disposed between the first substrate 110 and the second substrate 120.

The first sub-pixel PX1 may include a thin film transistor TR, which is connected to the first gate line GL1 and the first data line DL1, a liquid crystal capacitor Clc, which is connected to the thin film transistor TR, and a storage capacitor Cst, which is connected to the liquid crystal capacitor Clc. The storage capacitor Cst may be optional.

The thin film transistor TR may be disposed on the first substrate 110. The thin film transistor TR may include a gate electrode connected to the first gate line GL1, a source electrode connected to the first data line DL1, and a drain electrode connected to the liquid crystal capacitor Clc and the storage capacitor Cst.

The liquid crystal capacitor Clc may include a pixel electrode PE disposed on the first substrate 110, a common electrode CE disposed on the second substrate 120, and the liquid crystal layer LC disposed between the pixel electrode PE and the common electrode CE. The liquid crystal layer LC may serve as a dielectric material. The pixel electrode PE may be electrically connected to the drain electrode of the thin film transistor TR.

FIG. 2 illustrates an example in which the pixel electrode PE does not have a slit pattern. The pixel electrode PE may include a slit pattern to define a plurality of domains in the first sub-pixel PX1. The liquid crystal layer LC may include liquid crystal molecules having different orientations according to different domains defined by the first sub-pixel PX1.

The common electrode CE may be formed throughout the second substrate 120. The common electrode CE may be disposed on the first substrate 110. When both the common electrode CE and the pixel electrode PE are disposed on the first substrate 110, at least one of the pixel electrode PE and the common electrode CE may include a slit pattern.

The storage capacitor Cst may include the pixel electrode PE, a storage electrode (not shown), which diverges from a storage line (not shown), and an insulating layer, which is disposed between the pixel electrode PE and the storage electrode. The storage line may be disposed on the first substrate 110. The storage line and the gate lines GL1-GLn may be simultaneously formed on the same layer. The storage electrode may partially overlap the pixel electrode PE.

The first sub-pixel PX1 may further include a color filter CF displaying one of red, green, and blue colors. The color filter CF may be disposed on the second substrate 120, as shown in FIG. 2. The color filter CF may be disposed on the first substrate 110.

The thin film transistor TR may be turned on in response to a gate signal provided through the first gate line GL1. When the thin film transistor TR is turned on, a data voltage, which is applied to the first data line DL1, may be provided to the pixel electrode PE of the liquid crystal capacitor Clc through the thin film transistor TR.

The common electrode CE may be applied with a common voltage. Due to a difference in voltage level between the data voltage and the common voltage, an electric field may be produced between the pixel electrode PE and the common electrode CE. The electric field between the pixel and common electrodes PE and CE may be used to change the orientation of liquid crystal molecules in the liquid crystal layer LC. The change in orientation of the liquid crystal molecules may be used to adjust optical transmittance of the light provided from the backlight unit 500, and this may be used to display an image.

The storage line may be applied with a storage voltage of a constant voltage level. The storage line may be applied with the common voltage. The storage capacitor Cst may be used to compensate a charged voltage of the liquid crystal capacitor Clc.

Referring to FIG. 1, the signal controller 400 may receive an input image signal I-RGB and a plurality of control signals I-CS from a device/component external to the display device 1000. The signal controller 400 may convert the input image signals I-RGB into output image signals D-RGB, which are suitable for interfacing with the data driver 300, through a rendering process. The signal controller 400 may provide the output image signals D-RGB to the data driver 300. The signal controller 400 may produce a data control signal D-CS (e.g., an output start signal and so forth) and a gate control signal G-CS (e.g., a scan start signal, a clock signal, or a clock bar signal), based on the control signals I-CS. The signal controller 400 may provide the data control signal D-CS to the data driver 300 and may provide the gate control signal G-CS to the gate driver 200.

The gate driver 200 may sequentially output gate signals, in response to the gate control signal G-CS provided from the signal controller 400. Accordingly, pixels PX may be sequentially controlled by the gate signals according to pixel rows.

The data driver 300 may convert the output image signals D-RGB to the data voltages, in response to the data control signal D-CS provided from the signal controller 400. The data driver 300 may apply the data voltages to the data lines DL1-DLm of the display panel 100.

Thus, each pixel PX may be turned-on by a gate signal, and the turned-on pixel PX may receive the corresponding data voltage from the data driver 300 and may display an image of a desired gradation.

As shown in FIG. 1, the backlight unit 500 may be placed on a bottom/back surface of the display panel 100 to provide light to the display panel 100 through the bottom/back surface of the display panel 100. The backlight driver 600 may receive a light source control signal B-CS from the signal controller 400 to drive the backlight unit 500 in synchronization with the display panel 100.

Figure 3:
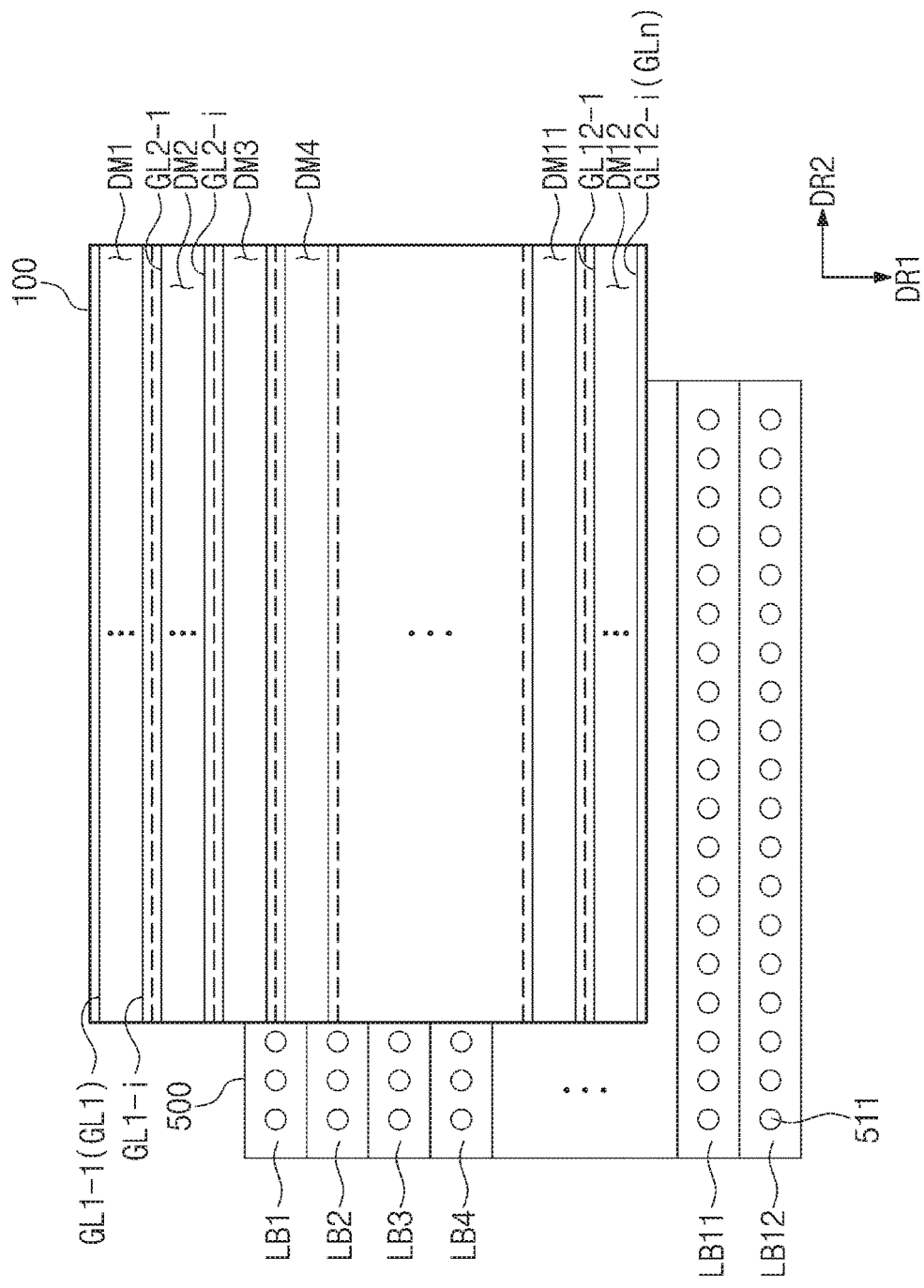
FIG. 3 is a block diagram illustrating a display panel and a backlight unit according to an embodiment.

FIG. 3 is a block diagram illustrating a display panel and a backlight unit according to an embodiment.

Referring to FIG. 3, the backlight unit 500 may include a plurality of light source blocks LB1-LB12. The light source blocks LB1-LB12 of the backlight unit 500 may include twelve light source blocks, first to twelfth light source blocks LB1-LB12. The first to twelfth light source blocks LB1-LB12 may be arranged in a specific direction. The first to twelfth light source blocks LB1-LB12 may be arranged in the first direction DR1.

The display panel 100 may include dimming regions DM1-DM12, which are separated from each other. The dimming regions DM1-DM12 may correspond to the light source blocks LB1-LB12 of the backlight unit 500, respectively. The number of the dimming regions defined in the display panel 100 may be configured depending on the number of the light source blocks. For example, if twelve light source blocks are provided in the backlight unit 500, twelve dimming regions may be provided in the display panel 100. The display panel 100 may include twelve dimming regions, first to twelfth dimming regions DM1-DM12, which are separated from each other.

As shown in FIGS. 1 and 3, the first to twelfth light source blocks LB1-LB12 of the backlight unit 500 may be disposed below the display panel 100. The first to twelfth dimming regions DM1-DM12 of the display panel 100 may be arranged in an arrangement direction of the first to twelfth light source blocks LB1-LB12. For example, the first to twelfth dimming regions DM1-DM12 may be arranged in the first direction DR1.

Each of the first to twelfth light source blocks LB1-LB12 may include at least one light source 511. The light source 511 may include a light-emitting diode. FIG. 3 illustrates an example, in which multiple light-emitting diodes are provided in each of the first to twelfth light source blocks LB1-LB12. The number of the light-emitting diodes provided in each of the first to eighth light source blocks LB1-LB8 may be configured according to embodiments.

A local dimming technology may be used for changing a duty ratio of a driving signal applied to each of the first to twelfth light source blocks LB1-LB12, to adjust an amount of light emitted from each of the first to twelfth light source blocks LB1-LB12. Accordingly, intensities of lights provided to the first to twelfth dimming regions DM1-DM12 of the display panel 100 may be different from region to region.

The display panel 100 may include the gate lines GL1-GLn, which are parallel to the second direction DR2. The gate lines GL1-GLn may be grouped into twelve groups, which are disposed corresponding to the dimming regions DM1-DM12. If n gate lines GL1-GLn are grouped into the twelve groups, i gate lines GL1-GLi (i=n/12) may be disposed in each dimming region. The number n is a natural number greater than twelve, and the number i is a natural number greater than one.

The gate lines disposed in the first dimming region DM1 will be referred to as (1-1)-th to (1-i)-th gate lines GL1-1 to GL1-i, the gate lines disposed in the second dimming region DM2 will be referred to as (2-1)-th to (2-i)-th gate lines GL2-1 to GL2-i, and the gate lines disposed in the twelfth dimming region DM12 will be referred to as (12-1)-th to (12-i)-th gate lines GL12-1 to GL12-i.

Figure 4:
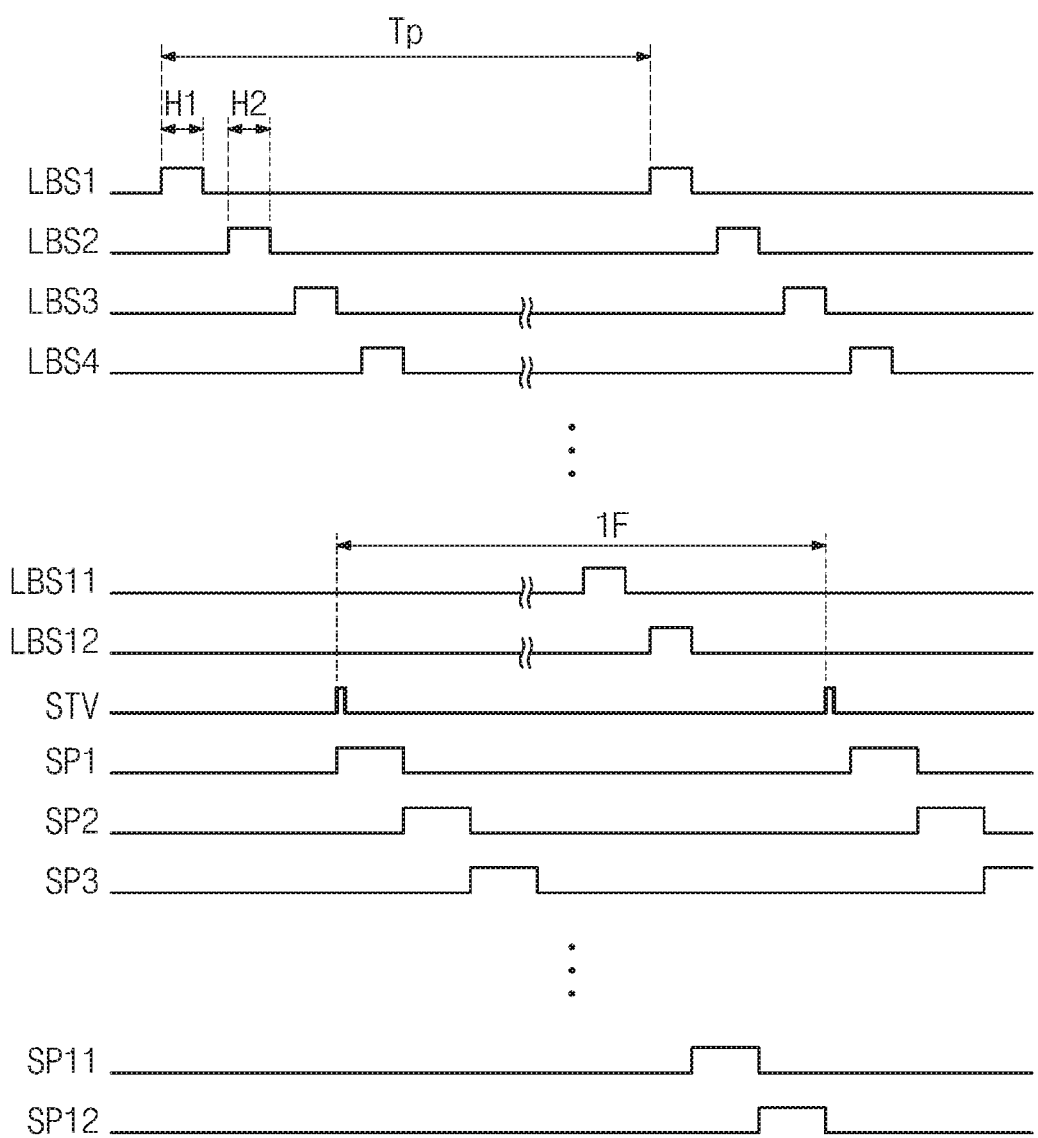
FIG. 4 is a waveform diagram illustrating turn-on periods for first to twelfth light source blocks of FIG. 3 and scan periods for first to twelfth dimming regions of FIG. 3 according to an embodiment.
Figure 5:
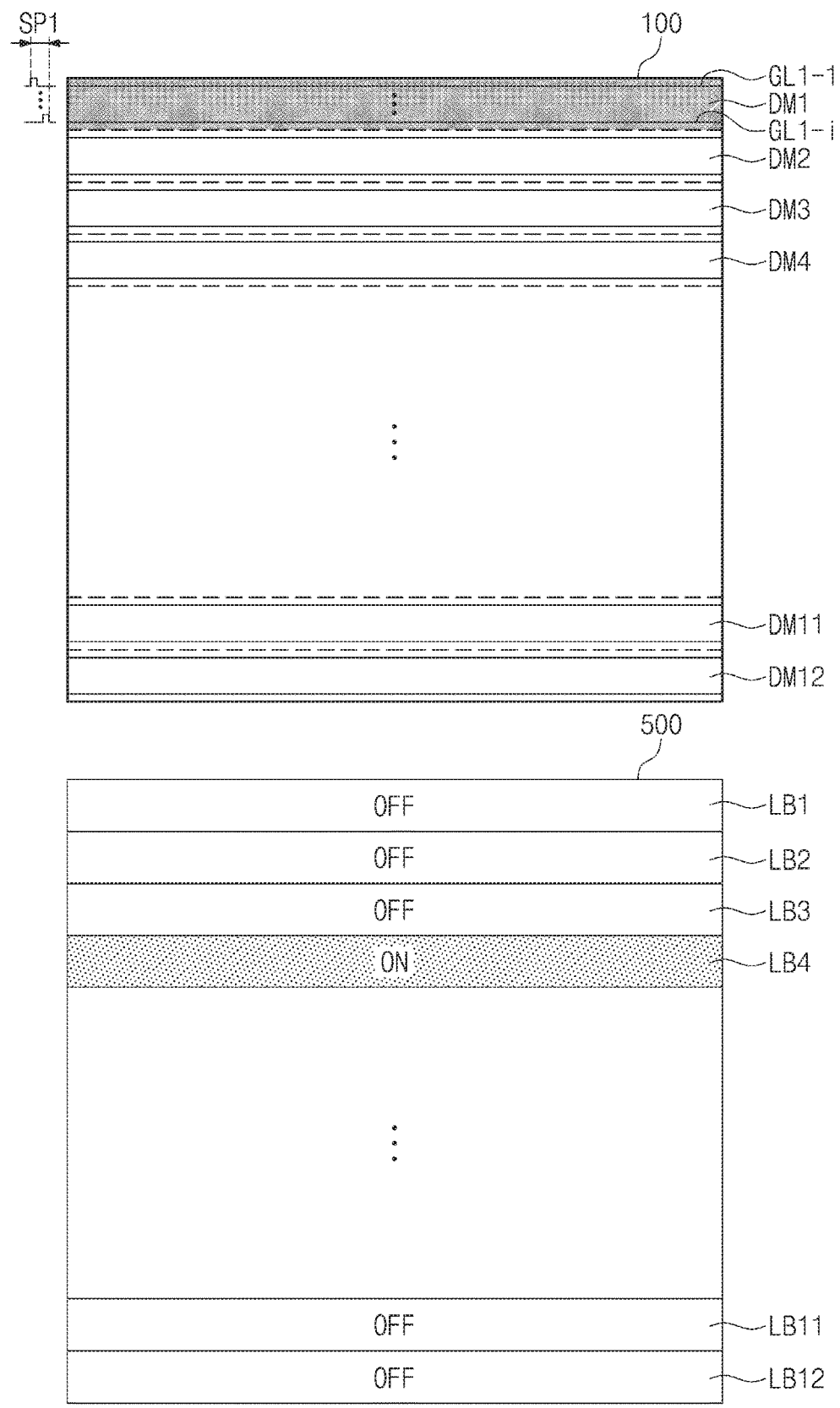
FIG. 5 illustrates operation states of the backlight unit and the display panel in a first scan period of FIG. 4 according to an embodiment.

FIG. 4 is a waveform diagram illustrating turn-on periods for the first to twelfth light source blocks of FIG. 3 and scan periods for the first to twelfth dimming regions of FIG. 3 according to an embodiment. FIG. 5 illustrates operation states of the backlight unit and the display panel in a first scan period according to an embodiment.

Referring to FIGS. 3 to 5, the first to twelfth light source blocks LB1-LB12 may be sequentially turned on in the first direction DR1. The first to twelfth light source blocks LB1-LB12 may receive first to twelfth light source driving signals LBS1-LBS12, respectively. The first to twelfth light source driving signals LBS1-LBS12 may be signals provided from the backlight driver 600 of FIG. 1.

Each of the first to twelfth light source blocks LB1-LB12 may include a turn-on period/state ON and a turn-off period/state OFF. Each of the first to twelfth light source blocks LB1-LB12 may be turned on corresponding to a high period of a corresponding light source driving signal and may be turned off corresponding to a low period. For example, the turn-on period/state ON of the first light source block LB1 may correspond to a high period/state H1 of the first light source driving signal LBS1, and the turn-on period/state ON of the second light source block LB2 may correspond to a high period/state H2 of the second light source driving signal LBS2. The high period H1 of the first light source driving signal LBS1 may not overlap the high period H2 of the second light source driving signal LBS2. That is, the first light source block LB1 and the second light source block LB2 may not be turned on at the same time.

The gate lines GL1-GLn, which are sequentially arranged in the first direction DR1 on the display panel 100, may be sequentially scanned (i.e., provided with scan/gate signals) in the first direction DR1. In each of the dimming regions DM1-DM12, i gate lines may be sequentially scanned in the first direction DR1. For each of the dimming regions DM1-DM12, a period in which the i gate lines are scanned may be defined as a scan period. If the first to twelfth dimming regions DM1-DM12 are defined in the display panel 100, a single frame period 1F, which is taken to wholly scan the display panel 100, may include first to twelfth scan period SP1-SP12. The (1-1)-th to (1-i)-th gate lines GL1-1 to GL1-I, which are disposed in the first dimming region DM1, may be sequentially scanned in the first direction DR1 during the first scan period SP1.

If a scan start signal STV, which initiates a start of the single frame period 1F of the display panel 100, becomes a high state, the scan may be sequentially started from the (1-1)-th gate lines GL1-1 to (1-i)-th gate lines GL1-i of the first dimming region DM1. A frequency of the scan start signal STV may be the same as a frequency of each of the light source driving signals LBS1-LBS12.

The first dimming region DM1 may be positioned corresponding to the first light source block LB1, but the first scan period SP1 of the first dimming region DM1 may not overlap the high period H1 of the first light source driving signal LBS1. That is, the first scan period SP1 of the first dimming region DM1 may be disposed in the turn-off period/state OFF of the first light source block LB1. The turn-on period ON of each of the light source blocks LB1-LB12 may not overlap the scan period of its corresponding/overlapping dimming region.

The first scan period SP1 of the first dimming region DM1 may overlap a turn-on period of the fourth light source block LB4 (i.e., a high interval/state H4 of the fourth light source driving signal LBS4). The first scan period SP1 of the first dimming region DM1 may be started at or before a rising time of the fourth light source driving signal LBS4. The starting time of the first scan period SP1 of the first dimming region DM1 may be depend on a duty ratio of the first light source driving signal LBS1.

When each of the dimming regions DM1-DM12 is scanned, its corresponding/overlapping light source block may be in a turned-off state, because the turn-on period ON of each of the light source blocks LB1-LB12 does not overlap the scan period of the dimming region corresponding to the light source block. All pixels in each of the dimming regions DM1-DM12 may be scanned in the turn-off period OFF of the corresponding light source block. If some pixels (e.g., a first pixel group) in each of the dimming regions DM1-DM12 are scanned in the turn-on period ON of the corresponding light source block and if the remaining pixels (e.g., a second pixel group) are scanned in the turn-off period OFF of the corresponding light source block, there may be a difference in charging voltages between the first and second pixel groups, the difference of the charging voltages may affect brightness characteristics of the pixel groups, such that a pixel group with the lowered charging voltage may display a black stripe. As a result of the scan operation, the display device may show a black stripe moving in downward according to the scan direction.

Referring to FIG. 4, all pixels in each of the dimming regions DM1-DM12 are scanned in the turn-off period OFF of the corresponding light source block. Advantageously, it may be possible to prevent a difference of charging voltages between the pixels in the corresponding dimming region. No significant difference in charging voltages between the pixels in each of the dimming regions DM1-DM12 may occur, such that the above-mentioned unwanted back stripe may be prevented.

Figure 6:
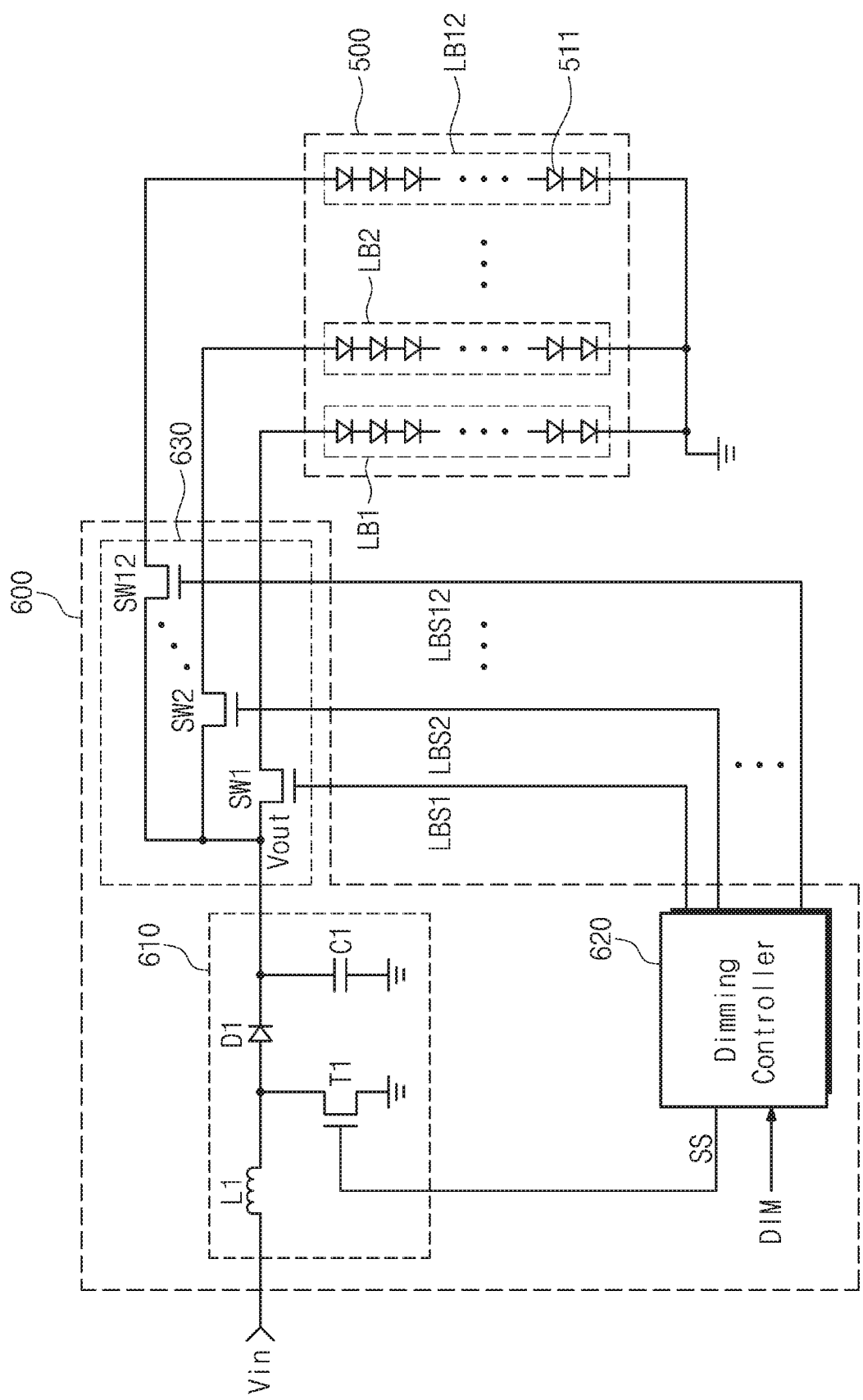
FIG. 6 is a block diagram illustrating a structure of a backlight driver and a backlight unit shown in FIG. 1 according to an embodiment.

FIG. 6 is a block diagram illustrating a structure of the backlight driver and the backlight unit shown in FIG. 1 according to an embodiment.

Referring to FIG. 6, the backlight driver 600 may include a boost circuit unit 610, a dimming controller 620, and a switching unit 630. The backlight unit 500 may include the light source blocks LB1-LB12, which are connected in parallel to the backlight driver 600. Each of the first to twelfth light source blocks LB1-LB12 may include a plurality of light sources 511 (e.g., light-emitting diodes), which are connected in series. The number of the light source blocks LB1-LB12 included in the backlight unit 500 may be configured according to embodiments.

An output terminal of the boosting circuit unit 610 may be connected to each of the input terminals of the light source blocks LB1-LB12. The boosting circuit unit 610 may include a DC/DC converter. The boosting circuit unit 610 may receive an input voltage Vin, may boost up the received input voltage Vin, and may output the ramped voltage as a driving voltage Vout.

The driving voltage Vout, which is output from the boosting circuit unit 610, may be a voltage for driving the light source blocks LB1-LB12 and may be provided to the light source blocks LB1-LB12. The driving voltage Vout may have a voltage level in a range from 20 V to 35 V.

The boosting circuit unit 610 may include a coil L1, a diode D1, a capacitor C1, and a transistor T1. A first terminal of the coil L1 may receive the input voltage Vin, and a second terminal of the coil L1 may be connected to an anode terminal of the diode D1.

A control terminal of the transistor T1 may be connected to the dimming controller 620 to receive a switching signal SS. An input terminal of the transistor T1 may be connected to the second terminal of the coil L1, and an output terminal of the transistor T1 may be connected to a ground. A cathode terminal of the diode D1 and the first terminal of the capacitor C1 may be connected to the output terminal of the boosting circuit unit 610 (which may output the driving voltage Vout), and a second terminal of the capacitor C1 may be connected to the ground.

The transistor T1 may be turned on or off, in response to the switching signal SS, and the coil L1 may ramp up the input voltage Vin depending on an on/off operation of the transistor T1. The boosting circuit unit 610 may adjust a voltage level of the driving voltage Vout in response to the switching signal SS. For example, the voltage level of the driving voltage Vout output from the boosting circuit unit 610 may be changed depending on a duty ratio of the switching signal SS.

If the duty ratio of the switching signal SS is decreased, the voltage level of the driving voltage Vout output from the boosting circuit unit 610 may be decreased. If the duty ratio of the switching signal SS is increased, the voltage level of the driving voltage Vout may be increased.

The dimming controller 620 may receive a dimming signal DIM. The dimming signal DIM may be a pulse width modulation (PWM) signal, which is used to adjust brightness of each of the light source blocks LB1-LB12. The dimming controller 620 may output a plurality of light source driving signals LBS1-LBS12, each of which is used to adjust the brightness of a corresponding one of the light source blocks LB1-LB12 of the backlight unit 500, according to the dimming signal DIM. The light source driving signals LBS1-LBS12 may be provided to the switching unit 630.

The switching unit 630 may selectively apply (instances of) the driving voltage to the light source blocks LB1-LB12 in accordance with the light source driving signals LBS1-LBS12. The widths (i.e., lengths) of the high periods of the light source driving signals LBS1-LBS12 may be adjusted depending on the dimming signal DIM.

The switching unit 630 may include a plurality of switching devices SW1-SW12. The number of the switching devices SW1-SW12 may be equal to the number of the light source blocks LB1-LB12. The switching unit 630 may include first to twelfth switching devices SW1-SW12, which are respectively connected to the first to twelfth light source blocks LB1-LB12.

Each of the switching devices SW1-SW12 may include a control electrode receiving a corresponding light source driving signal, an input electrode receiving the driving voltage, and an output electrode connected to a corresponding light source block.

Referring to FIGS. 4 and 6, the first switching device SW1 may be turned on in response to the high period H1 of the first light source driving signal LBS1, and the driving voltage may be supplied to the first light source block LB1 through the turned-on first switching device SW1. Accordingly, the first light source block LB1 may be turned on during the high period H1 of the first light source driving signal LBS1. The high period/state H1 of the first light source driving signal LBS1 may correspond to the turn-on period/state ON of the first light source block LB1. When the first light source driving signal LBS1 becomes a low state, the first switching device SW1 may be turned off. The turned-off first switching device SW1 may block the driving voltage Vout, which is output from the boosting circuit unit 610, from being supplied to the first light source block LB1. Thus, the first light source block LB1 may be turned off in the low period/state of the first light source driving signal LBS1. The low period/state of the first light source driving signal LBS1 may correspond to the turn-off period/state OFF of the first light source block LB1.

Each of the second to twelfth switching devices SW1-SW12 may be operated in the same manner as the first switching device SW1 to turn the corresponding light source block on or off.

As shown in FIGS. 4 and 6, the second light source driving signal LBS2 may be supplied to a second switching device SW2. The high period H2 of the second light source driving signal LBS2 may not overlap the high period H1 of the first light source driving signal LBS1. This means that the turn-on period ON of the first light source block LB1 may not overlap the turn-on period ON of the second light source block LB2, such that the first light source block LB1 and the second light source block LB2 may not be on at the same time. For example, if a width of the high period of each of the first to twelfth light source driving signals LBS1-LBS12 is less than a value obtained from multiplying one driving period Tp of each of the light source driving signals LBS1-LBS12 by 1/12, the high periods of the first to twelfth light source driving signals LBS1-LBS12 may not overlap each other.

In an embodiment, the high period H2 of the second light source driving signal LBS2 may partially overlap the high period H1 of the first light source driving signal LBS1. This means that the turn-on period ON of the first light source block LB1 may partially overlap the turn-on period ON of the second light source block LB2, such that the first light source block LB1 and the second light source block LB2 may be on at the same time during the overlap.

The width of the high period of each of the light source driving signals LBS1-LBS12 may be determined by the dimming signal DIM of the dimming controller 620. If the duty ratio of the dimming signal DIM is increased, the relative width of the high period of each of the light source driving signals LBS1-LBS12 may be increased. If the duty ratio of the dimming signal DIM is decreased, the duty ratio of each of the light source driving signals LBS1-LBS12 may be decreased.

Although not illustrated in the drawings, the dimming controller 620 may be connected to output terminals of the light source blocks LB1-LB12 to receive a current value from each of the light source blocks LB1-LB12. In this case, the dimming controller 620 may control the duty ratio of each of the light source driving signals LBS1-LBS12, based on the feedback current value of each of the light source blocks LB1-LB12. For example, if the current value feedback from the first light source block LB1 is greater than a reference value, the dimming controller 620 may reduce a duty ratio of the first light source driving signal LBS1; if the feedback current value is less than the reference value, the dimming controller 620 may increase the duty ratio of the first light source driving signal LBS1. Accordingly, each of the first to twelfth light source blocks LB1-LB12 may be maintained to constant brightness.

Figure 7:
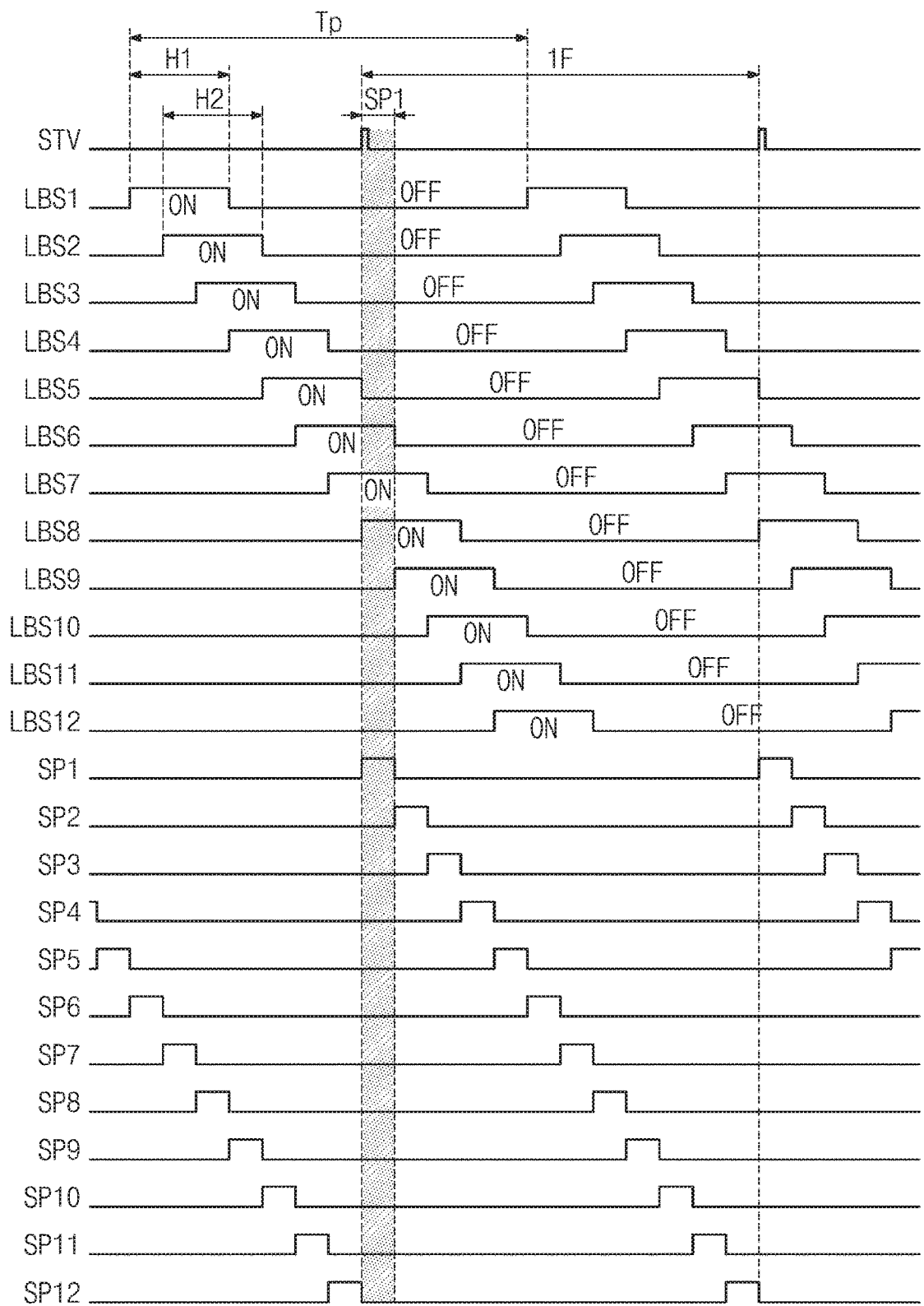
FIG. 7 is a waveform diagram illustrating turn-on periods for first to twelfth light source blocks and scan periods of first to twelfth dimming regions according to an embodiment.
Figure 8:
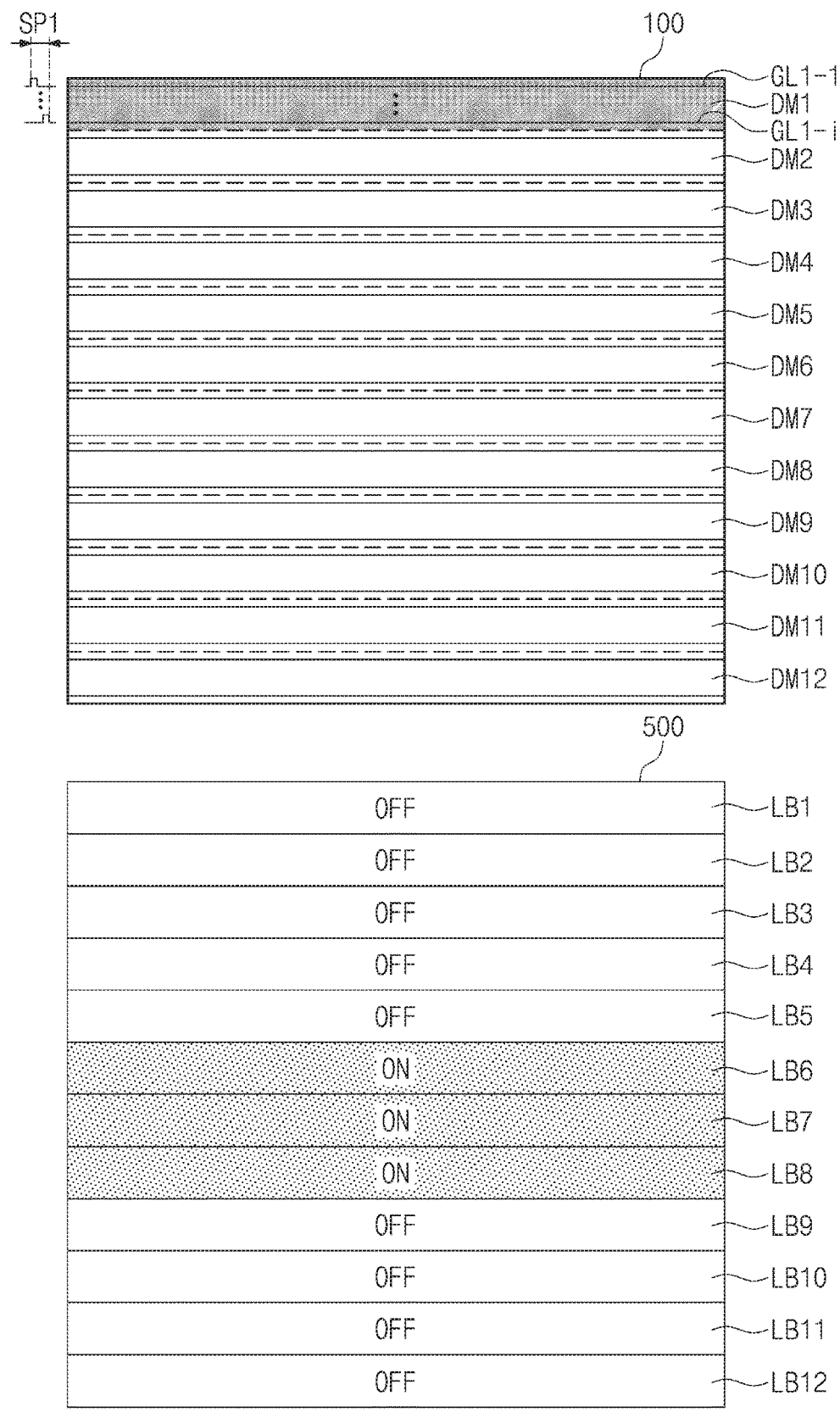
FIG. 8 illustrates operation states of the backlight unit and the display panel in a first scan period of FIG. 7 according to an embodiment.

FIG. 7 is a waveform diagram illustrating turn-on periods for first to twelfth light source blocks and scan periods of first to twelfth dimming regions according to an embodiment. FIG. 8 illustrates operation states of the backlight unit and the display panel in a first scan period of FIG. 7 according to an embodiment.

Referring to FIGS. 3, 7, and 8, the first to twelfth light source blocks LB1-LB12 may be sequentially turned on in the first direction DR1. The first to twelfth light source blocks LB1-LB12 may receive first to twelfth light source driving signals LBS1-LBS12, respectively.

Each of the first to twelfth light source blocks LB1-LB12 may have the turn-on period/state ON and the turn-off period/state OFF. Each of the first to twelfth light source blocks LB1-LB12 may be turned on corresponding to a high period/state of a corresponding light source driving signal and may be turned off corresponding to a low period/state. For example, the turn-on period/state ON of the first light source block LB1 may correspond to the high period/state H1 of the first light source driving signal LBS1, and the turn-on period/state ON of the second light source block LB2 may correspond to the high period/state H2 of the second light source driving signal LBS2. The high period H1 of the first light source driving signal LBS1 may partially overlap the high period H2 of the second light source driving signal LBS2.

Each of the first to twelfth light source driving signals LBS1-LBS12 may have a duty ratio of 25%. A width of the high period of each of the first to twelfth light source driving signals LBS1-LBS12 is equal to a value obtained from multiplying the driving period Tp of each of the light source driving signals LBS1-LBS12 by 3/12. In this case, the high periods of three adjacent signals generated adjacent to each other among the first to twelfth light source driving signals LBS1-LBS12 may overlap each other. Three light source blocks may be on at the same time during the overlap.

A plurality of the dimming regions DM1-DM12 may be provided in the display panel 100. In each of the dimming regions DM1-DM12, i gate lines may be sequentially scanned in the first direction DR1. For each of the dimming regions DM1-DM12, a period in which the i gate lines are scanned may be defined as a scan period. One frame period 1F, which is taken to wholly scan the display panel 100, may include first to twelfth scan intervals SP1-SP12. The (1-1)-th to (1-i)-th gate lines GL1-1 to GL1-I, which are disposed in the first dimming region DM1, may be sequentially scanned in the first direction DR1 during the first scan period SP1.

If a scan start signal STV, which initiates a start of the one frame period 1F of the display panel 100, becomes a high state, the scan may be sequentially started from the (1-1)-th to (1-i)-th gate lines GL1-1 to GL1-i of the first dimming region DM1. A frequency of the scan start signal STV may be the same as a frequency of each of the light source driving signals LBS1-LBS12.

The first dimming region DM1 may be positioned corresponding to the first light source block LB1, but the first scan period SP1 of the first dimming region DM1 may not overlap the turn-on period ON of the first light source block LB1. The first scan period SP1 may not overlap the high period/state H1 of the first light source driving signal LBS1.

The first scan period SP1 of the first dimming region DM1 may overlap an interval in which the sixth, seventh, and eighth light source blocks LB6, LB7, and LB8 are on at the same time. The first scan period SP1 of the first dimming region DM1 may be started at or before the rising time of the eighth light source driving signal LBS8. The starting time of the first scan period SP1 of the first dimming region DM1 may be set to prevent the first scan period SP1 from overlapping the high period H1 of the first light source driving signal LBS1, within the one frame period 1F.

Start times, which are respectively suitable for the duty ratios of the light source driving signals LBS1-LBS12, for the scan start signal STV may be stored in a look-up table 410 (refer to FIG. 1). The signal controller 400 of FIG. 1 may generate the scan start signal STV at an optimized start times based on the look-up table 410 and may supply the scan start signal STV to the gate driver 200. The scan operation of the display panel 100 may be initiated when a predetermined time has elapsed since the first light source block LB1 of the backlight unit 500 is turned on.

When each of the dimming regions DM1-DM12 is scanned, the corresponding/overlapping light source block may be in a turned-off state, because the turn-on period ON of each of the light source blocks LB1-LB12 does not overlap the scan period of the dimming region corresponding to the light source block. All pixels in each of the dimming regions DM1-DM12 may be scanned in the turn-off period/state OFF of the corresponding light source block. Accordingly, it may be possible to prevent a difference of charging voltages between the pixels in the corresponding dimming region. No significant difference in charging voltages between the pixels in each of the dimming regions DM1-DM12 may occur, such that no unwanted black stripes may be displayed or perceived. As a result, an overall display quality of the display device 1000 (e.g., see FIG. 1) may be satisfactory.

Figure 9:
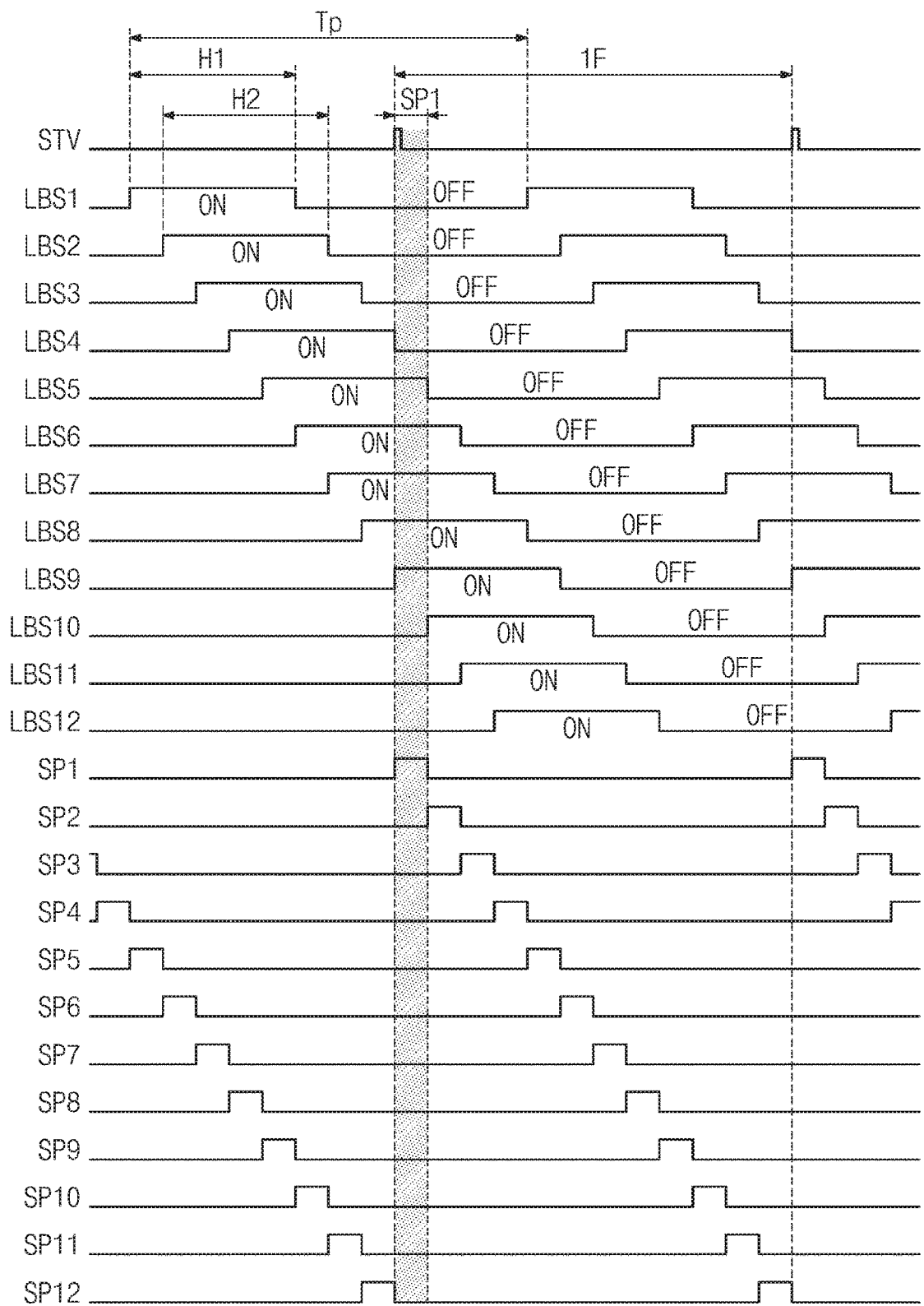
FIG. 9 is a waveform diagram illustrating turn-on periods for first to twelfth light source blocks and scan periods of first to twelfth dimming regions according to an embodiment.

FIG. 9 is a waveform diagram illustrating turn-on periods for first to twelfth light source blocks and scan periods of first to twelfth dimming regions according to an embodiment.

Referring to FIG. 3 and FIG. 9, the first to twelfth light source blocks LB1-LB12 may be sequentially turned on in the first direction DR1. The first to twelfth light source blocks LB1-LB12 may receive first to twelfth light source driving signals LBS1-LBS12, respectively.

Each of the first to twelfth light source blocks LB1-LB12 may be turned on corresponding to a high period of a corresponding light source driving signal and may be turned off corresponding to a low period. The high period H1 of the first light source driving signal LBS1 may partially overlap the high period H2 of the second light source driving signal LBS2.

Each of the first to twelfth light source driving signals LBS1-LBS12 may have a duty ratio of 41.6%. A width of the high period of each of the first to twelfth light source driving signals LBS1-LBS12 may be equal to a value obtained from multiplying the one driving period Tp of each of the light source driving signals LBS1-LBS12 by $5/12$. In this case, the high periods of five adjacent signals generated adjacent to each other among the first to twelfth light source driving signals LBS1-LBS12 may overlap each other. The five light source blocks may be on at the same time during the overlap.

A plurality of the dimming regions DM1-DM12 may be provided in the display panel 100. In each of the dimming regions DM1-DM12, i gate lines may be sequentially scanned in the first direction DR1. For each of the dimming regions DM1-DM12, a period in which the i gate lines are scanned may be defined as a scan period. One frame period 1F, which is taken to wholly scan the display panel 100, may include first to twelfth scan periods SP1-SP12. The (1-1)-th to (1-i)-th gate lines GL1-1 to GL1-I, which are disposed in the first dimming region DM1, may be sequentially scanned in the first direction DR1 during the first scan period SP1.

When a scan start signal STV, which initiates a start of the one frame period 1F of the display panel 100, becomes a high state, the scan may be sequentially started from the (1-1)-th to (1-i)-th gate lines GL1-1 to GL1-$i$ of the first dimming region DM1. A frequency of the scan start signal STV may be the same as a frequency of each of the light source driving signals LBS1-LBS12.

The first dimming region DM1 may be positioned corresponding to the first light source block LB1, but the first scan period SP1 of the first dimming region DM1 may not overlap the high period H1 of the first light source driving signal LBS1. Thus, the turn-off period of the first light source block LB1 may not overlap the first scan period SP1 of the first dimming region DM1.

The first scan period SP1 of the first dimming region DM1 may overlap a period in which the fifth to ninth light source blocks LB5-LB9 are turned off at the same time. The first scan period SP1 of the first dimming region DM1 may be started at or before a rising time of the ninth light source driving signal LBS9. The starting time of the first scan period SP1 of the first dimming region DM1 may be set to prevent the first scan period SP1 from overlapping the high period H1 of the first light source driving signal LBS1, within the single frame period 1F.

When each of the dimming regions DM1-DM12 is scanned, the corresponding/overlapping light source block may be in a turned-off state, because the turn-on period ON of each of the light source blocks LB1-LB12 does not overlap the scan period of the dimming region corresponding to the light source block. All pixels in each of the dimming regions DM1-DM12 may be scanned in the turn-off period OFF of the corresponding light source block. Accordingly, it may be possible to prevent a difference of charging voltages between the pixels in the corresponding dimming region. No significant difference in charging voltages between the pixels in each of the dimming regions DM1-DM12 may occur, such that no unwanted black stripes may be displayed or perceived. As a result, an overall display quality of the display device 1000 (e.g., see FIG. 1) may be satisfactory.

Figure 10:
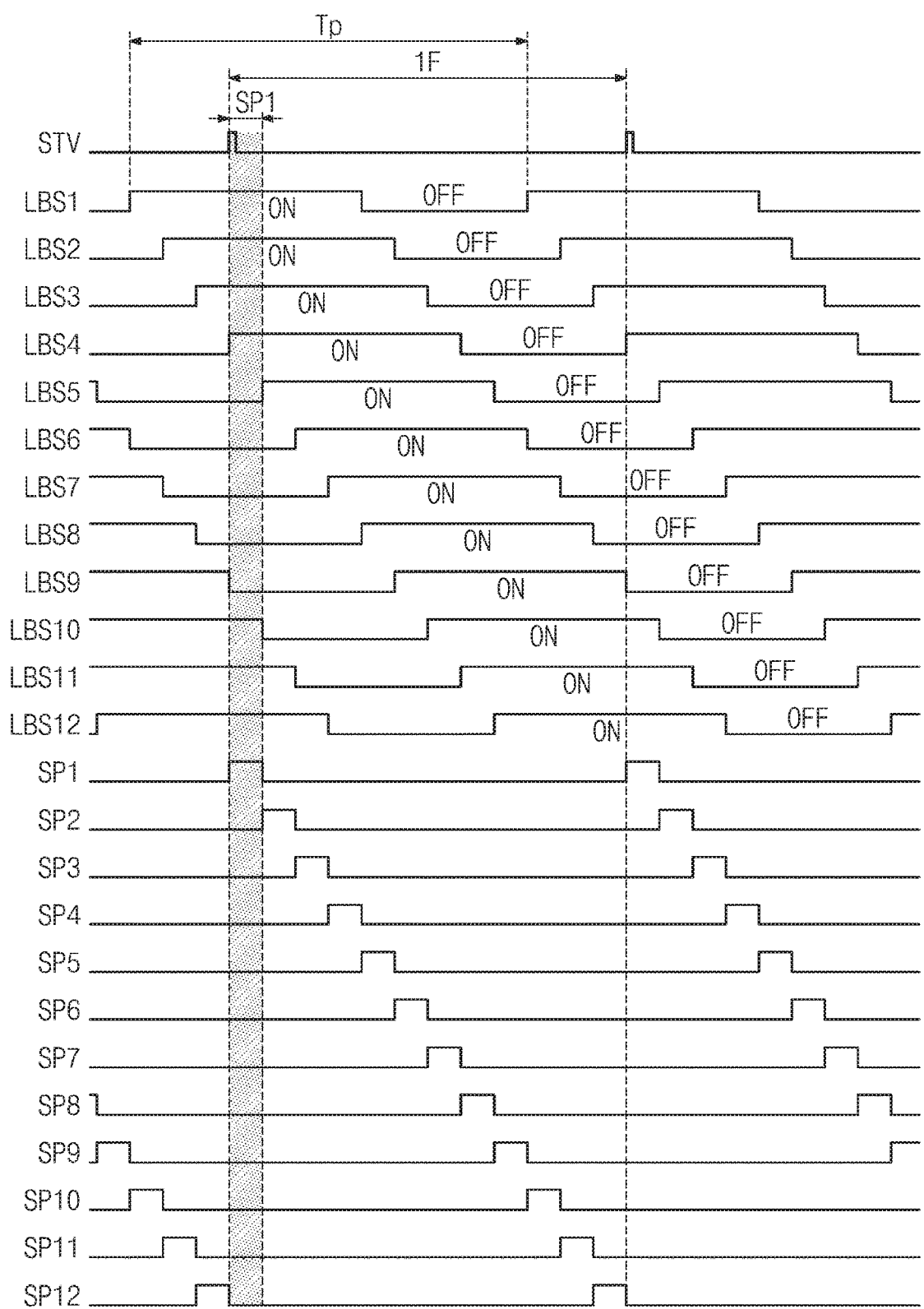
FIG. 10 is a waveform diagram illustrating turn-on periods for first to twelfth light source blocks and scan periods of first to twelfth dimming regions according to an embodiment.
Figure 11:
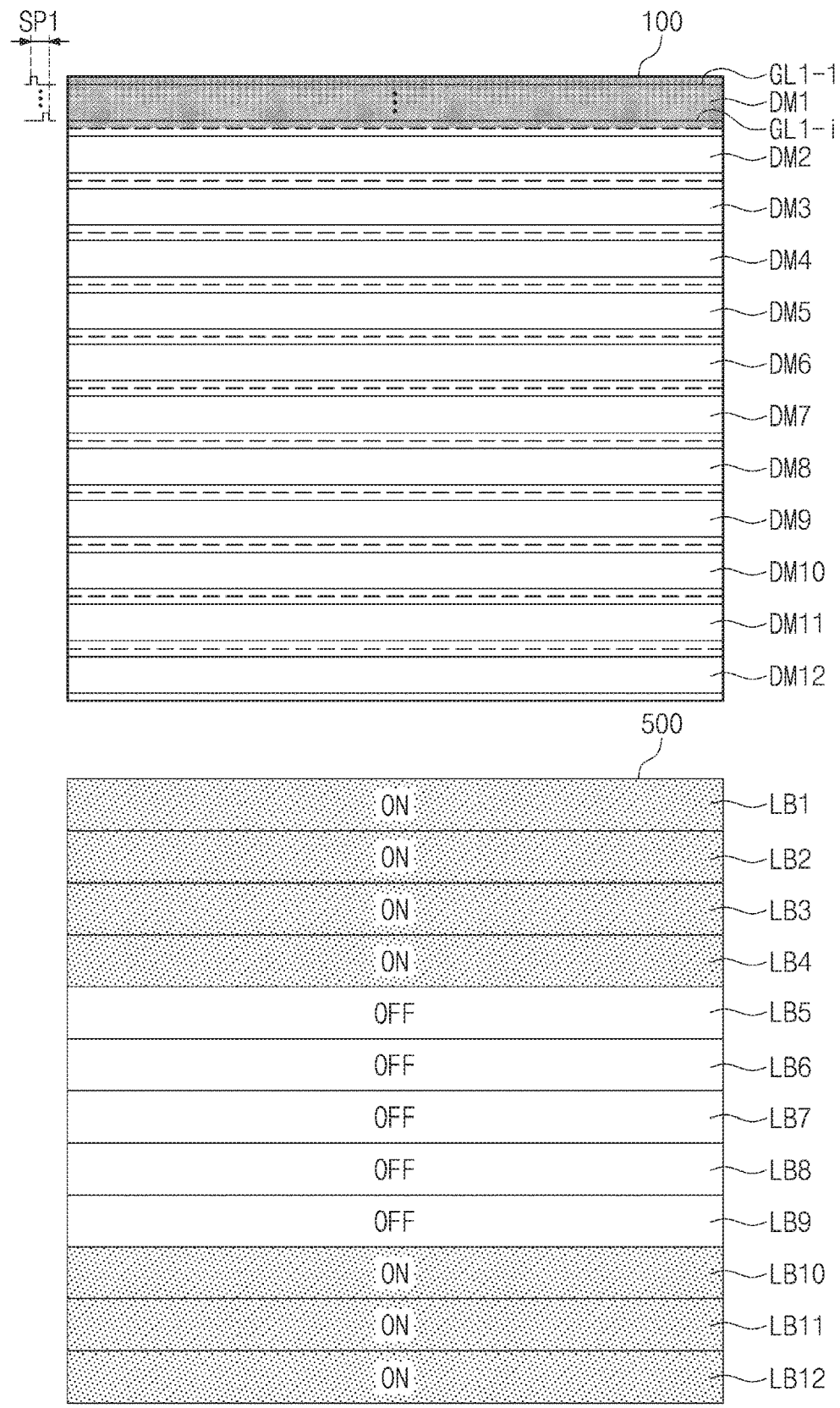
FIG. 11 illustrates operation states of the backlight unit and the display panel in a first scan period of FIG. 10 according to an embodiment.

FIG. 10 is a waveform diagram illustrating turn-on periods for first to twelfth light source blocks and scan periods of first to twelfth dimming regions according to an embodiment. FIG. 11 illustrates operation states of the backlight unit and the display panel in a first scan period of FIG. 10 according to an embodiment.

Referring to FIGS. 3, 10, and 11, the first to twelfth light source blocks LB1-LB12 may be sequentially turned on in the first direction DR1. The first to twelfth light source blocks LB1-LB12 may receive first to twelfth light source driving signals LBS1-LBS12, respectively.

Each of the first to twelfth light source blocks LB1-LB12 may be turned on corresponding to a high period of a corresponding light source driving signal and may be turned off corresponding to a low period. In an embodiment, each of the light source driving signals LBS1-LBS12 may have a duty ratio of 50% or greater.

Each of the first to twelfth light source driving signals LBS1-LBS12 may have a duty ratio of 58.3%. A width of the high interval of each of the first to twelfth light source driving signals LBS1-LBS12 may be equal to a value obtained from multiplying the one driving period Tp of each of the light source driving signals LBS1-LBS12 by $7/12$. In this case, the high periods of seven adjacent signals generated adjacent to each other among the first to twelfth light source driving signals LBS1-LBS12 may overlap each other. The seven light source blocks may be on at the same time during the overlap.

A plurality of the dimming regions DM1-DM12 may be provided in the display panel 100. One frame period 1F, which is taken to wholly scan the display panel 100, may include first to twelfth scan periods SP1-SP12.

When a scan start signal STV, which initiates a start of the one frame period 1F of the display panel 100, becomes a high state, the scan may be sequentially started from the (1-1)-th to (1-i)-th gate lines GL1-1 to GL1-i of the first dimming region DM1. A frequency of the scan start signal STV may be the same as a frequency of each of the light source driving signals LBS1-LBS12.

The first scan period SP1 of the first dimming region DM1 may overlap the high period H1 of the first light source driving signal LBS1. A width of the first scan period SP1 may be smaller than the high period H1 of the first light source driving signal LBS1. Thus, the turn-off period OFF of the first light source block LB1 may not overlap the first scan period SP1 of the first dimming region DM1.

The first scan period SP1 of the first dimming region DM1 may overlap a period in which the first to fourth light source blocks LB1-LB4 and the tenth to twelfth light source blocks LB10-LB12 are on at the same time. The first scan period SP1 of the first dimming region DM1 may be started at or before a rising time of the fourth light source driving signal LBS4. The starting time of the first scan period SP1 of the first dimming region DM1 may be set to prevent the first scan period SP1 from overlapping the low period of the first light source driving signal LBS1, within the one frame period 1F.

When each of the dimming regions DM1-DM12 is scanned, the corresponding/overlapping light source block may be in a turned-on state, because the turn-off period OFF of each of the light source blocks LB1-LB12 does not overlap the scan period of the dimming region corresponding to the light source block. All pixels in each of the dimming regions DM1-DM12 may be scanned in the turn-on period ON of the corresponding light source block. Accordingly, it may be possible to prevent a difference of charging voltages between the pixels in the corresponding dimming region. No significant difference in charging voltages between the pixels in each of the dimming regions DM1-DM12 may occur, such that no unwanted black stripes may be displayed or perceived. As a result, an overall display quality of the display device 1000 (e.g., see FIG. 1) may be satisfactory.

Figure 12:
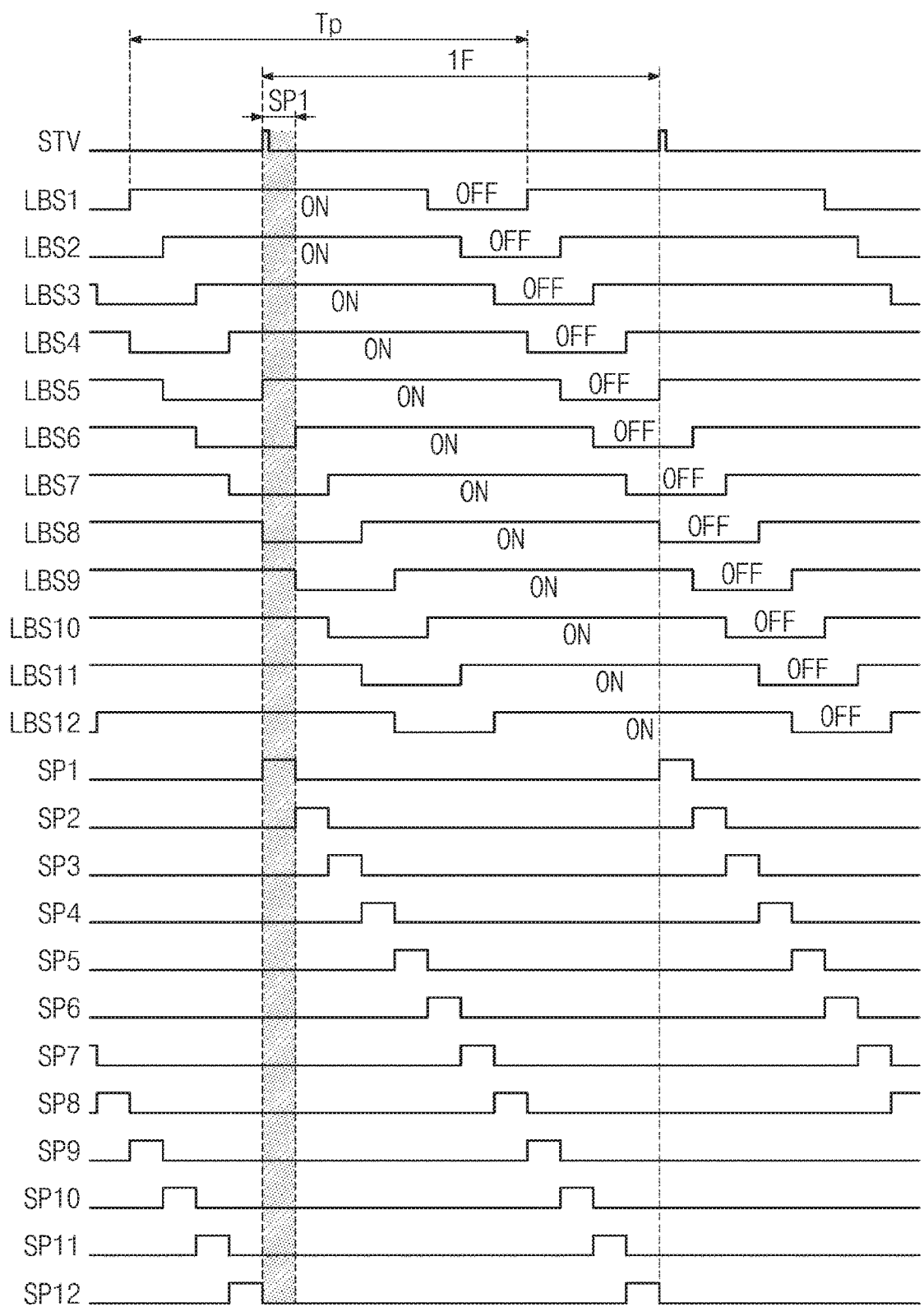
FIG. 12 is a waveform diagram illustrating turn-on periods for first to twelfth light source blocks and scan periods of first to twelfth dimming regions according to an embodiment.

FIG. 12 is a waveform diagram illustrating turn-on periods for first to twelfth light source blocks and scan periods of first to twelfth dimming regions according to an embodiment.

Each of the first to twelfth light source driving signals LBS1-LBS12 may have a duty ratio of 75%. A width of the high period of each of the first to twelfth light source driving signals LBS1-LBS12 may be equal to a value obtained from multiplying the one driving period Tp of each of the light source driving signals LBS1-LBS12 by $9/12$. In this case, the high periods of nine adjacent signals generated adjacent to each other among the first to twelfth light source driving signals LBS1-LBS12 may overlap each other. The nine light source blocks may be on at the same time during the overlap.

The first scan period SP1 of the first dimming region DM1 may overlap the high period H1 of the first light source driving signal LBS1. A width of the first scan period SP1 may be smaller than the high period H1 of the first light source driving signal LBS1. Thus, the turn-off period OFF of the first light source block LB1 may not overlap the first scan period SP1 of the first dimming region DM1.

The first scan period SP1 of the first dimming region DM1 may overlap a period in which the first to fifth light source blocks LB1-LB5 and the ninth to twelfth light source blocks LB9-LB12 are on at the same time. The first scan period SP1 of the first dimming region DM1 may be started at or before a rising time of the fifth light source driving signal LBS5. The starting time of the first scan period SP1 of the first dimming region DM1 may be set to prevent the first scan period SP1 from overlapping the low period of the first light source driving signal LBS1, within the one frame period 1F.

When each of the dimming regions DM1-DM12 is scanned, the corresponding/overlapping light source block c may be in a turned-on state, because the turn-off period OFF of each of the light source blocks LB1-LB12 does not overlap the scan period of the dimming region corresponding to the light source block. All pixels in each of the dimming regions DM1-DM12 may be scanned in the turn-on period ON of the corresponding light source block. Accordingly, it may be possible to prevent a difference of charging voltage between the pixels in the corresponding dimming region. No significant difference in charging voltages between the pixels in each of the dimming regions DM1-DM12 may occur, such that no unwanted black stripes may be displayed or perceived. As a result, an overall display quality of the display device 1000 (e.g., see FIG. 1) may be satisfactory.

Figure 13:
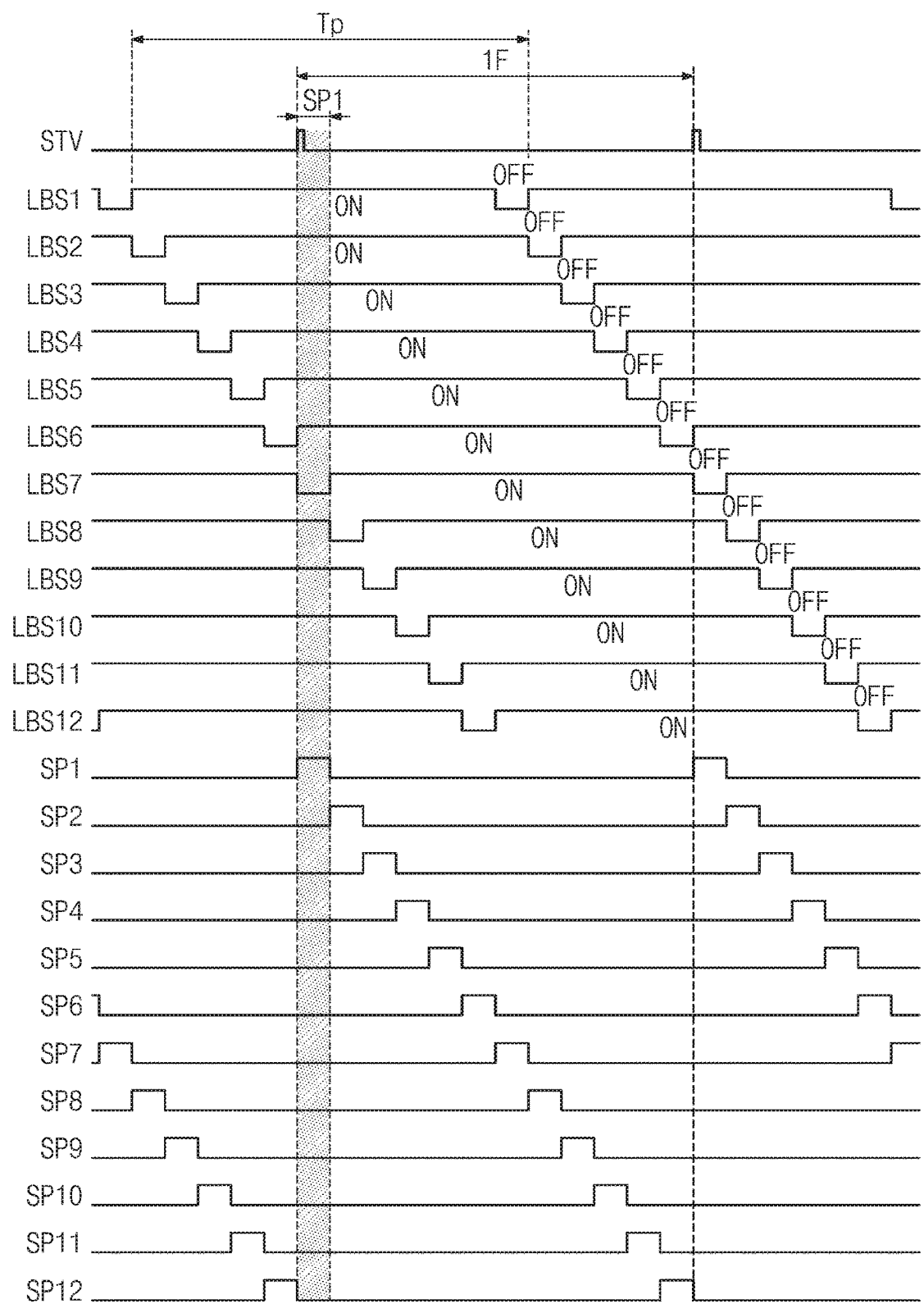
FIG. 13 is a waveform diagram illustrating turn-on periods for first to twelfth light source blocks and scan periods of first to twelfth dimming regions according to an embodiment.

FIG. 13 is a waveform diagram illustrating turn-on periods for first to twelfth light source blocks and scan periods of first to twelfth dimming regions according to an embodiment.

Each of the first to twelfth light source driving signals LBS1-LBS12 may have a duty ratio of 91.6%. A width of the high period of each of the first to twelfth light source driving signals LBS1-LBS12 may be equal to a value obtained from multiplying the one driving period Tp of each of the light source driving signals LBS1-LBS12 by $11/12$. In this case, the high periods of eleven adjacent signals generated adjacent to each other among the first to twelfth light source driving signals LBS1-LBS12 may overlap each other. The eleven light source blocks may be on at the same time during the overlap.

The first scan period SP1 of the first dimming region DM1 may overlap the high period H1 of the first light source driving signal LBS1. A width of the first scan period SP1 may be smaller than the high period H1 of the first light source driving signal LBS1. Thus, the turn-off period OFF of the first light source block LB1 may not overlap the first scan period SP1 of the first dimming region DM1.

The first scan period SP1 of the first dimming region DM1 may overlap a period in which the first to sixth light source blocks LB1-LB6 and the eighth to twelfth light source blocks LB8-LB12 are on at the same time. The first scan period SP1 of the first dimming region DM1 may be started at a rising time of the sixth light source driving signal LBS6. The starting time of the first scan period SP1 of the first dimming region DM1 may be set to prevent the first scan period SP1 from overlapping the low period of the first light source driving signal LBS1, within the one frame period 1F.

When each of the dimming regions DM1-DM12 is scanned, the corresponding/overlapping light source block may be in a turned-on state, because the turn-off period OFF of each of the light source blocks LB1-LB12 does not overlap the scan period of the dimming region corresponding to the light source block. All pixels in each of the dimming regions DM1-DM12 may be scanned in the turn-on period ON of the corresponding light source block. Accordingly, it may be possible to prevent a difference of charging voltages between the pixels in the corresponding dimming region, which is caused by the light leakage. No significant difference in charging voltages between the pixels in each of the dimming regions DM1-DM12 may occur, such that no unwanted black stripes may be displayed or perceived. As a result, an overall display quality of the display device 1000 (e.g., see FIG. 1) may be satisfactory.

Figure 14:
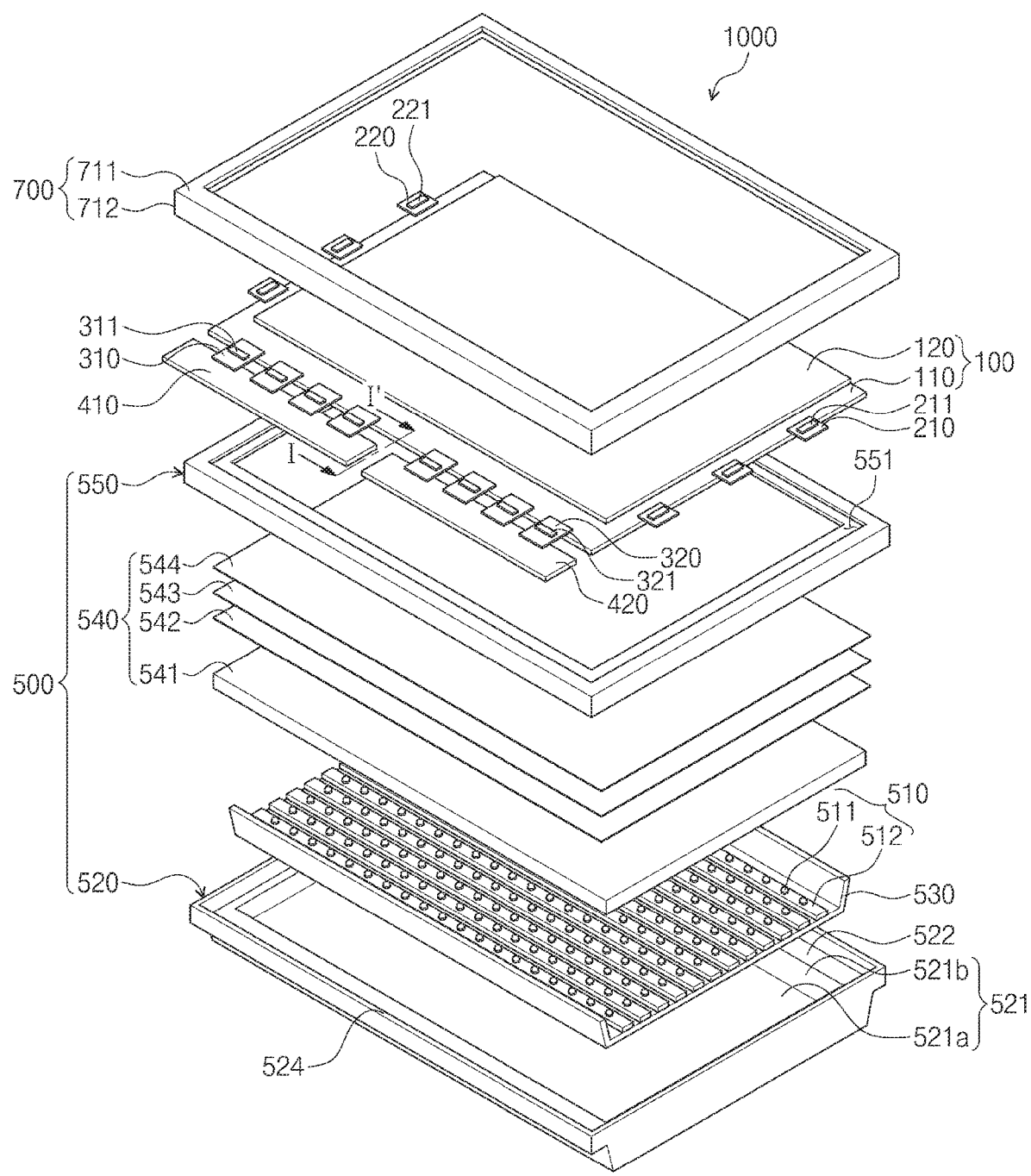
FIG. 14 is a perspective view of a display device according to an embodiment.
Figure 15:
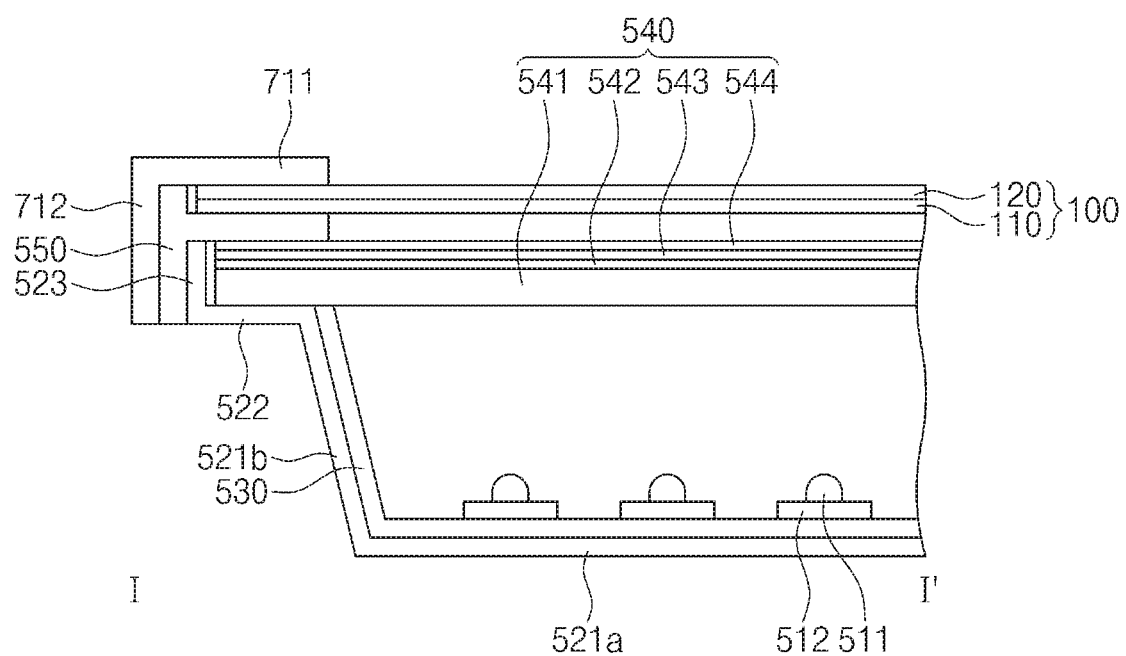
FIG. 15 is a cross-sectional view taken along line I-I' of FIG. 14 according to an embodiment.

FIG. 14 is a perspective view of a display device according to an embodiment. FIG. 15 is a cross-sectional view taken along line I-I' of FIG. 14 according to an embodiment.

Referring to FIGS. 14 and 15, the display device 1000 may include the backlight unit 500 for generating light and may include the display panel 100 for receiving the light and for displaying an image.

The display panel 100 may include the first and second substrates 110 and 120, which are coupled to each other and face each other, and the liquid crystal layer LC (e.g., see FIG. 2) interposed between the first and second substrates 110 and 120. The structure of the first and second substrates 110 and 120 was described with reference to FIG. 2.

The display device 1000 may include printed circuit boards 410 and 420 and data-side driving circuit films 310 and 320, which connect the printed circuit boards 410 and 420 to the display panel 100. FIG. 14 illustrates that the display device 1000 includes first and second printed circuit boards 410 and 420. The first and second printed circuit boards 410 and 420 may be provided as a single printed circuit board.

The data-side driving circuit films 310 and 320 may include a first driving circuit film 310 and a second driving circuit film 320. The first driving circuit film 310 may connect the first printed circuit board 410 to the display panel 100, and the second driving circuit film 320 may connect the second printed circuit board 420 to the display panel 100.

Data driving chips 311 and 321 may be mounted on the data-side driving circuit films 310 and 320. The data driving chips 311 and 321 may include first and second data driving chips 311 and 321. The first data driving chip 311 may be mounted on the first driving circuit film 310, and the second data driving chip 321 may be mounted on the second driving circuit film 320. The first and second driving circuit films 310 and 320 may be formed of flexible materials.

Each of the first and second data driving chips 311 and 321 may include a data driver 300 (e.g., see FIG. 1), which provides data signals to the data lines of the display panel 100 in response to the data control signal.

The display device 1000 may include gate-side driving circuit films 210 and 220, which are connected to the display panel 100, and gate driving chips 211 and 221, which are mounted on the gate-side driving circuit films 210 and 220. The gate-side driving circuit films 210 and 220 may include a third driving circuit film 210 and a fourth driving circuit film 220. The third driving circuit film 210 may be connected to an end of the display panel 100, and the fourth driving circuit film 220 may be connected to an opposite end of the display panel 100. An end of the display panel 100 may be a region of the display panel 100 in which ends of the gate lines GL1-GLn (e.g., see FIG. 1) are disposed, and the opposite end of the display panel 100 may be defined as an region of the display panel 100 in which opposite ends of the gate lines GL1-GLn are disposed.

The gate driving chips 211 and 221 may include a first gate driving chip 211, which is mounted on the third driving circuit film 210, and a second gate driving chip 221, which is mounted on the fourth driving circuit film 220. Each of the first and second gate driving chips 211 and 221 may include a gate driver 200 (e.g., see FIG. 1), which provides gate signals to the gate lines GL1-GLn of the display panel 100 in response to the gate control signal. The gate driver 200 may not be provided in a chip shape and may be formed in the display panel 100 by a thin film process.

The backlight unit 500 may include a light source assembly 510 (for generating light), a bottom chassis 520, a reflection sheet 530, an optical member 540, and a support frame 550.

The light source assembly 510 may include a plurality of light sources 511 and a circuit substrate 512, on which the light sources 511 are mounted. In an embodiment, a plurality of circuit substrates 512 may be provided in the light source assembly 510, and a plurality of light sources 511 may be disposed on each of the circuit substrates 512. Each of the light sources 511 may emit light in response to electrical signals provided from the corresponding circuit substrate 512. The number of the circuit substrates 512 may be equal to the number of the light source blocks. Referring to FIG. 3, the backlight unit 500 includes the first to twelfth light source blocks LB1-LB12; therefore, the light source assembly 510 may include twelve circuit substrates. The light sources 511 corresponding to each of the light source blocks LB1-LB12 may be mounted on one of the circuit substrates 512.

The light source assembly 510 may be stored in the bottom chassis 520 and may face the optical member 540. The bottom chassis 520 may include a storage part 521, in which the light source assembly 510 is stored.

The storage part 521 may have a bottom portion 521a and a side portion 521b extending from the bottom portion 521a, the bottom portion 521a may have a rectangular shape. The side portion 521b may extend from an edge of the bottom portion 521a to define a storage space, which is used to store the backlight unit 500. The bottom chassis 520 may be formed of, for example, an aluminum-containing metallic material which can efficiently dissipate heat generated by the backlight unit 500 to the environment, has high stiffness, and is unlikely to deform.

The reflection sheet 530 may be disposed between the light source assembly 510 and the storage part 521. The reflection sheet 530 may have a shape corresponding to the bottom portion 521a and the side portion 521b. The reflection sheet 530 may reflect light leaked to the light source assembly 510 toward the optical member 540. The reflection sheet 530 may improve optical efficiency of the backlight unit 500.

The bottom chassis 520 may include a support portion 522 supporting the optical member 540 and may include a guide wall 523 guiding the optical members 540. The support portion 522 may extend from the side portion 521b and may be disposed in a horizontal direction parallel to the optical member 540. The guide wall 523 may extend from the support portion 522 and may be disposed perpendicular or oblique relative to the optical member 540. The guide wall 523 may prevent the optical member 540, which is mounted on the support portion 522, from shaking in the horizontal direction.

The optical member 540 may include a diffusion plate 541 and optical sheets 542, 543, and 544. The diffusion plate 541 may be disposed on the light source assembly 510 to diffuse light emitted from the light source assembly 510 for improving the brightness uniformity of the display device 1000. The diffusion plate 541 may support the optical sheets 542, 543, and 544 to prevent the thin optical sheets 542, 543, and 544 from drooping.

The optical sheets 542, 543, and 544 may be disposed on the diffusion plate 541 and may improve a brightness property of light emitted from the diffusion plate 541. The optical sheets 542, 543, and 544 may include one diffusion sheet 542, which is used to diffuse light, and two light-gathering sheets 543 and 544, which are used to gather the light.

The diffusion sheet 542 may be disposed on the diffusion plate 541 to diffuse light emitted from the diffusion plate 541. The diffusion sheet 542 may be formed of a transparent material, e.g., polyethylene terephthalate (PET).

The light-gathering sheets 543 and 544 may be disposed on the diffusion sheet 542 to gather the light diffused by the diffusion sheet 542, for improving front-side brightness of the display device 1000. Each of the light-gathering sheets 543 and 544 may include a fine prism pattern (not shown). The light-gathering sheets 543 and 544 may include prisms that extend in different directions.

The support frame 550 may be disposed between the optical member 540 and the display panel 100. The support frame 550 may be coupled to the bottom chassis 520 to fasten the optical member 540 to the bottom chassis 520 and to prevent the optical member 540 from shaking in the vertical direction.

The support frame 550 may support the display panel 100. The support frame 550 may include a panel guide portion 551 for supporting and guiding the display panel 100.

The display device 1000 may include a top chassis 700, which is coupled to the support frame 550, faces the support frame 550, and fastens the display panel 100 to the support frame 550. The top chassis 700 may include a top cover portion 711 and a side cover portion 712. The top cover portion 711 may have an opening corresponding to the display region of the display panel 100. The side cover portion 712 may extend from the top cover portion 711 toward the support frame.

The top chassis 700 may enclose an edge of the display panel 100. The top chassis 700 may fasten the display panel 100 to the panel guide portion 551 of the support frame 550. The top chassis 700 may prevent the display panel 100 from being broken by an external impact and may prevent the display panel 100 from being deviated from the panel guide portion 551 of the support frame 550.

In a display device according to an embodiment, all pixels in each dimming region are scanned in a turn-off period of a corresponding light source block or in a turn-on period. Thus, it may be possible to prevent a difference in charging voltages between pixels in a corresponding dimming region.

In embodiments, no significant difference in charging voltage between the pixels in each dimming region may occur, such that no unwanted black stripes may be displayed or perceived. As a result, display quality of the display device may be satisfactory.

Example embodiments have been illustrated and described. Variations may be made in the example embodiments without departing from the scope of the attached claims.

What is claimed is:

1. A display device, comprising:
   a backlight unit including light source blocks that include a first light source block and are configured to emit light;
   a display panel including dimming regions that include a first dimming region and respectively overlap the light source blocks, wherein the first dimming region overlaps the first light source block; and
   a backlight driver electrically connected to the backlight unit and configured to control a turn-on period and a turn-off period of each of the light source blocks; and
   a panel driver electrically connected to the display panel and configured to sequentially provide scan signals to the dimming regions for controlling light transmission of the dimming regions,
   wherein a driving period of first light source block comprises a turn-on period and a turn-off period, the turn-off period of the first light source block starts before a scan period of the first dimming region and ends after the scan period of the first dimming region, and
   wherein the first dimming region receives corresponding scan signals in the scan period and the scan period is provided in the driving period of the first light source block.

2. The display device of claim 1, wherein the light source blocks are arranged in a first direction, and
   wherein the backlight driver sequentially provides light source driving signals to the light source blocks according to the first direction.

3. The display device of claim 1, wherein the scan period of the first dimming region overlaps the turn-on period of the first light source block in the driving period of the first light source block.

4. The display device of claim 1, wherein the scan period of the first dimming region overlaps a turn-on period of an n-th light source block in the driving period of the first light source block, and wherein the n-th light source block is different from the first light source block.

5. The display device of claim 1, wherein the panel driver is configured to set a scan start time of the scan period of the first dimming region based on a duty ratio, wherein the duty ratio is a ratio of a length of the turn-on period of the first light source block to a length of the driving period of the first light source block.

6. The display device of claim 5, wherein the duty ratio is less than 50%, wherein the light source blocks further include a second light source block, wherein the dimming regions further include a second dimming region that overlaps the second light source block, and wherein the turn-off period of the first light source block overlaps a scan period of the second dimming region.

7. The display device of claim 5, further comprising a lookup table that stores scan start times suitable for various duty ratios,
   wherein the panel driver sequentially provides the scan signals to the dimming regions at optimized scan start times determined based on the lookup table.

8. The display device of claim 1, wherein the backlight driver sequentially outputs light source driving signals to sequentially control the light source blocks.

9. The display device of claim 8, wherein the light source driving signals include a first light source driving signal for controlling the first light source block, wherein a value of the first light source driving signal is higher in a high period than in a low period, and wherein the low period overlaps the scan period of the first dimming region.

10. The display device of claim 8, wherein the panel driver comprises a gate driver sequentially providing the scan signals to the dimming regions in response to a scan start signal, and
    wherein a frequency of the scan start signal is equal to a frequency of one of the light source driving signals.

11. The display device of claim 1, wherein the first light source block comprises light-emitting diodes electrically connected in series.

* * * * *